United States Patent
Tobata et al.

(10) Patent No.: US 7,600,780 B2
(45) Date of Patent: Oct. 13, 2009

(54) PASSENGER PROTECTIVE DEVICE AND METHOD

(75) Inventors: Hideo Tobata, Yokosuka (JP); Kouichi Oota, Yamato (JP); Daisuke Masuda, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 492 days.

(21) Appl. No.: 11/405,857

(22) Filed: Apr. 18, 2006

(65) Prior Publication Data

US 2006/0255573 A1 Nov. 16, 2006

(30) Foreign Application Priority Data

Apr. 18, 2005 (JP) ............................. 2005-119934

(51) Int. Cl.
*B60R 21/18* (2006.01)

(52) U.S. Cl. ..................... 280/733; 280/736; 280/742

(58) Field of Classification Search ................. 280/733, 280/730.1, 729, 736, 738, 739, 742
See application file for complete search history.

(56) References Cited

U.S. PATENT DOCUMENTS

| | | | | |
|---|---|---|---|---|
| 3,430,979 A * | 3/1969 | Terry et al. | ................. | 280/733 |
| 3,702,706 A * | 11/1972 | Sobkow | .................... | 280/730.1 |
| 5,556,128 A * | 9/1996 | Sinnhuber et al. | ........ | 280/730.2 |
| 5,871,230 A * | 2/1999 | Lewis | ......................... | 280/733 |
| 6,113,135 A * | 9/2000 | Tsutsumi | ................. | 280/730.2 |
| 6,131,949 A * | 10/2000 | Lewis et al. | ................. | 280/739 |
| 6,378,898 B1 * | 4/2002 | Lewis et al. | ................. | 280/733 |
| 6,382,666 B1 * | 5/2002 | Devonport | ................. | 280/733 |
| 6,513,829 B1 * | 2/2003 | Zumpano | ................. | 280/730.1 |
| 7,055,853 B2 * | 6/2006 | Honda et al. | ............. | 280/730.2 |
| 7,083,187 B2 * | 8/2006 | Akiyama et al. | .......... | 280/730.1 |
| 7,137,647 B2 * | 11/2006 | Adomeit | ................... | 280/743.2 |
| 7,163,236 B2 * | 1/2007 | Masuda et al. | .............. | 280/733 |
| 7,207,596 B2 * | 4/2007 | Linder et al. | ............. | 280/730.2 |
| 7,211,752 B2 * | 5/2007 | Okamoto et | .......... | 200/61.58 R |
| 7,264,269 B2 * | 9/2007 | Gu et al. | ................... | 280/730.2 |
| 7,357,411 B2 * | 4/2008 | Kurimoto et al. | ........... | 280/729 |
| 7,413,220 B2 * | 8/2008 | Itoga et al. | ................... | 280/742 |
| 7,431,329 B2 * | 10/2008 | Taguchi et al. | .............. | 280/729 |
| 2004/0183285 A1 * | 9/2004 | Nishikaji et al. | ......... | 280/730.2 |
| 2006/0028004 A1 * | 2/2006 | Oota et al. | ................... | 280/733 |
| 2006/0103120 A1 * | 5/2006 | Kurimoto et al. | ........ | 280/730.2 |
| 2006/0131845 A1 * | 6/2006 | Belwafa et al. | ............. | 280/729 |
| 2006/0192367 A1 * | 8/2006 | Zumpano | ................. | 280/730.1 |
| 2006/0255573 A1 * | 11/2006 | Tobata et al. | ................. | 280/733 |

FOREIGN PATENT DOCUMENTS

JP 2006044614 A * 2/2006 * cited by examiner

*Primary Examiner*—Paul N Dickson
*Assistant Examiner*—Karen Jane J Amores
(74) *Attorney, Agent, or Firm*—Global IP Counselors, LLP

(57) ABSTRACT

To provide a passenger protective device and method that can achieve a stable protective performance even when deploying the airbag from the seat belt, thus allowing for appropriate restraint of the passenger's head. Passenger protective device 1 makes the timing in which the internal pressure of thigh airbag 12 peaks slower than the timing in which the internal pressure of head airbag 11 peaks. In addition, it also makes the timing in which the capacity of thigh airbag 12 reaches the maximum slower than the timing in which the capacity of head airbag 11 reaches the maximum. In this manner, the passenger's head, which moves due to inertial force, is caught by head airbag 11 and head airbag 11 is supported by thigh airbag 12, which is softer than said airbag 11. Therefore, the passenger's head can be caught softly.

28 Claims, 19 Drawing Sheets

PASSENGER PROTECTION STARTS

PASSENGER PROTECTION ENDS

Vu>Vl

Vu<Vl

WHEN THE PASSENGER PROTECTION STARTS

WHEN THE PASSENGER PROTECTION ENDS

WHEN THE PASSENGER PROTECTION STARTS

WHEN THE PASSENGER PROTECTION IS IN THE PROTECTION OF BEING PERFORMED

WHEN THE PASSENGER PROTECTION ENDS

PASSENGER PROTECTIVE DEVICE AND METHOD

CROSS REFERENCE

The present application claims priority under 35 U.S.C. § 119 of Japanese Patent Application No. 2005-119934, titled "PASSENGER PROTECTIVE DEVICE AND METHOD", filed on Apr. 18, 2005, the entire content of which is expressly incorporated by reference herein

FIELD

The present invention pertains to a passenger protective device and method.

BACKGROUND

Passenger protective devices that protect passengers by deploying an airbag equipped in the seatbelt are conventionally known. (refer to Unexamined Japanese Patent Application Publication No. H07-186861).

However, for the passenger protective device described in Unexamined Japanese Patent Application Publication No. H07-186861, the airbag equipped in the seatbelt deployed between the steering wheel and the passenger's body to absorb the kinetic energy, it was necessary to catch the airbag with the steering wheel in order to restrain the passenger with the airbag. Therefore, for the passenger protective device described in Patent Document 1, the performance that could be exhibited by the airbag depending upon the position of the steering wheel.

SUMMARY

According to the present invention, the passenger's head, which moves due to inertial force when the vehicle collides, is not caught by the steering wheel via the airbag, but is caught by the passenger's body by means of the airbag that has filled in the space from the passenger's head to the thigh. In this manner, a stable protective performance can be achieved even when deploying the airbag from the seatbelt.

BRIEF DESCRIPTION OF DRAWINGS

FIGS. 3(a) and 3(b) are an explanatory diagrams showing an overview of the passenger protective method pertaining to the present embodiment in which FIG. 3(a) is an illustration for when the passenger protection starts and FIG. 3(b) is an illustration for when the passenger protection ends.

FIGS. 6(a) and 6(b) are explanatory diagrams showing a comparison of the circumstances for when protection is provided according to the passenger protective method for the present embodiment and the circumstances for when passenger protection is provided according to an airbag equipped near the steering wheel in which FIG. 6(a) shows the contact position between the passenger's head and the airbag and FIG. 6(b) shows the speed of the passenger's head when it is protected.

FIGS. 13(a) and 13(b) are explanatory diagrams showing the method used to set the output of the inflators pertaining to Embodiment 5 in which FIG. 13(a) is an example of when the head airbag is larger than the thigh airbag and FIG. 13(b) is an example of when the head airbag is smaller than the thigh airbag.

FIGS. 15(a) and a5(b) are diagrams showing the detailed constitution of the internal pressure sensors and valve shown in FIG. 14 in which FIG. 15(a) shows the area around the seat and FIG. 15(b) is a detailed illustration of the valve.

FIGS. 17(a) and 17(b) are diagrams showing the detailed constitution of the valve according to the passenger protective device pertaining to Embodiment 7 in which FIG. 17(a) shows the area around the seat and FIG. 17(b) is a detailed illustration of the valve.

FIGS. 19(a) and 19(b) are explanatory diagrams showing an overview of the passenger protective method pertaining to Embodiment 8 in which FIG. 19(a) is an illustration of when passenger protection starts and FIG. 19(b) is an illustration of when passenger protection ends.

FIGS. 20(a), 20(b), and 20(c) are explanatory diagrams showing an overview of the passenger protective method pertaining to Embodiment 9 in which FIG. 20(a) is an illustration of when passenger protection starts, FIG. 20(b) is an illustration of when passenger protection is in the process of being performed and FIG. 20(c) is an illustration of when passenger protection ends.

DETAILED DESCRIPTION

Figure 1:
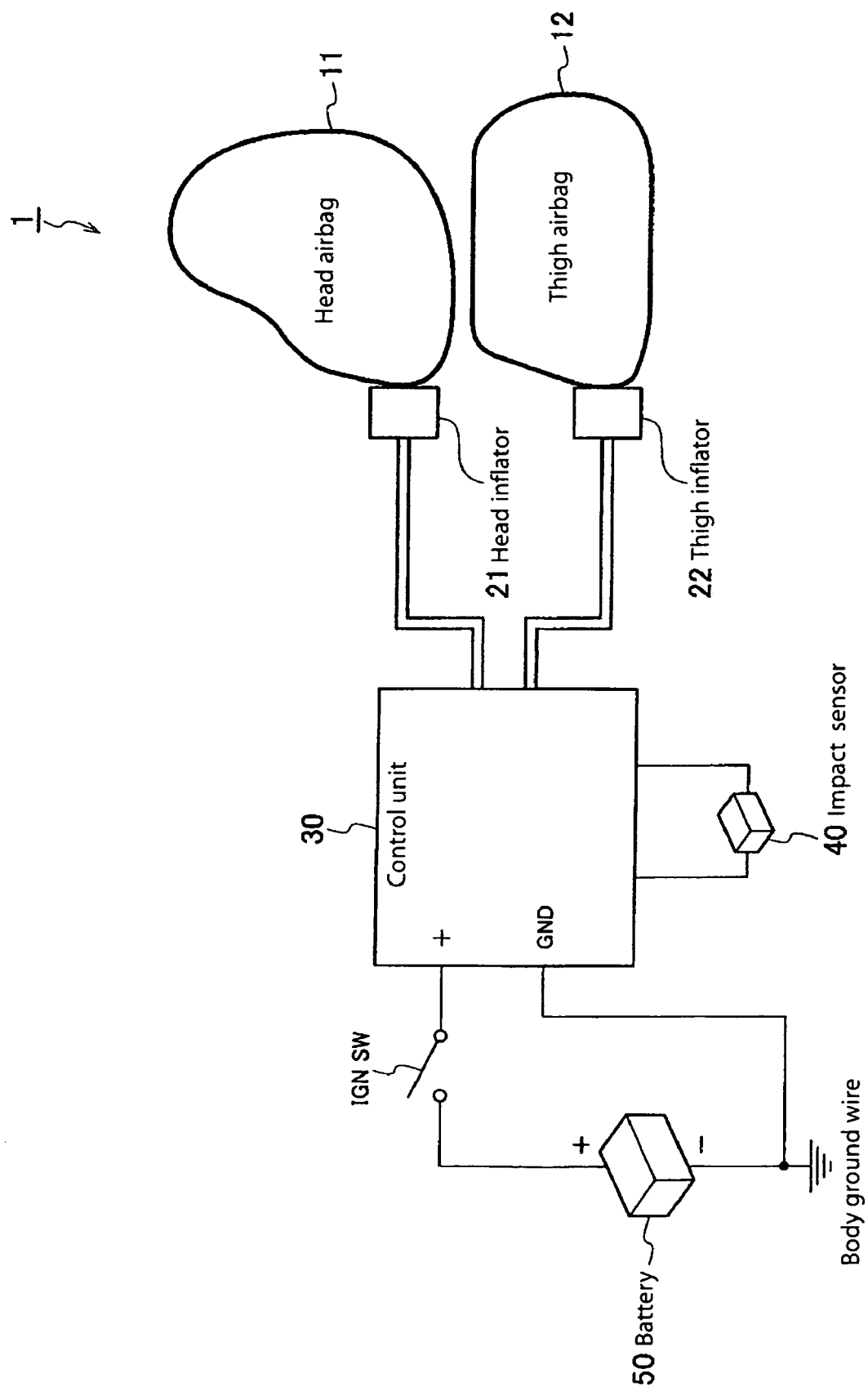
FIG. 1 is a diagram showing the constitution of the passenger protective device pertaining to Embodiment 1 of the present invention.

Next is provided an explanation of a favorable embodiment of the present invention based on the drawings. Explanation has been omitted for components with the same or similar reference symbols appearing in the drawings.

Figure 2:
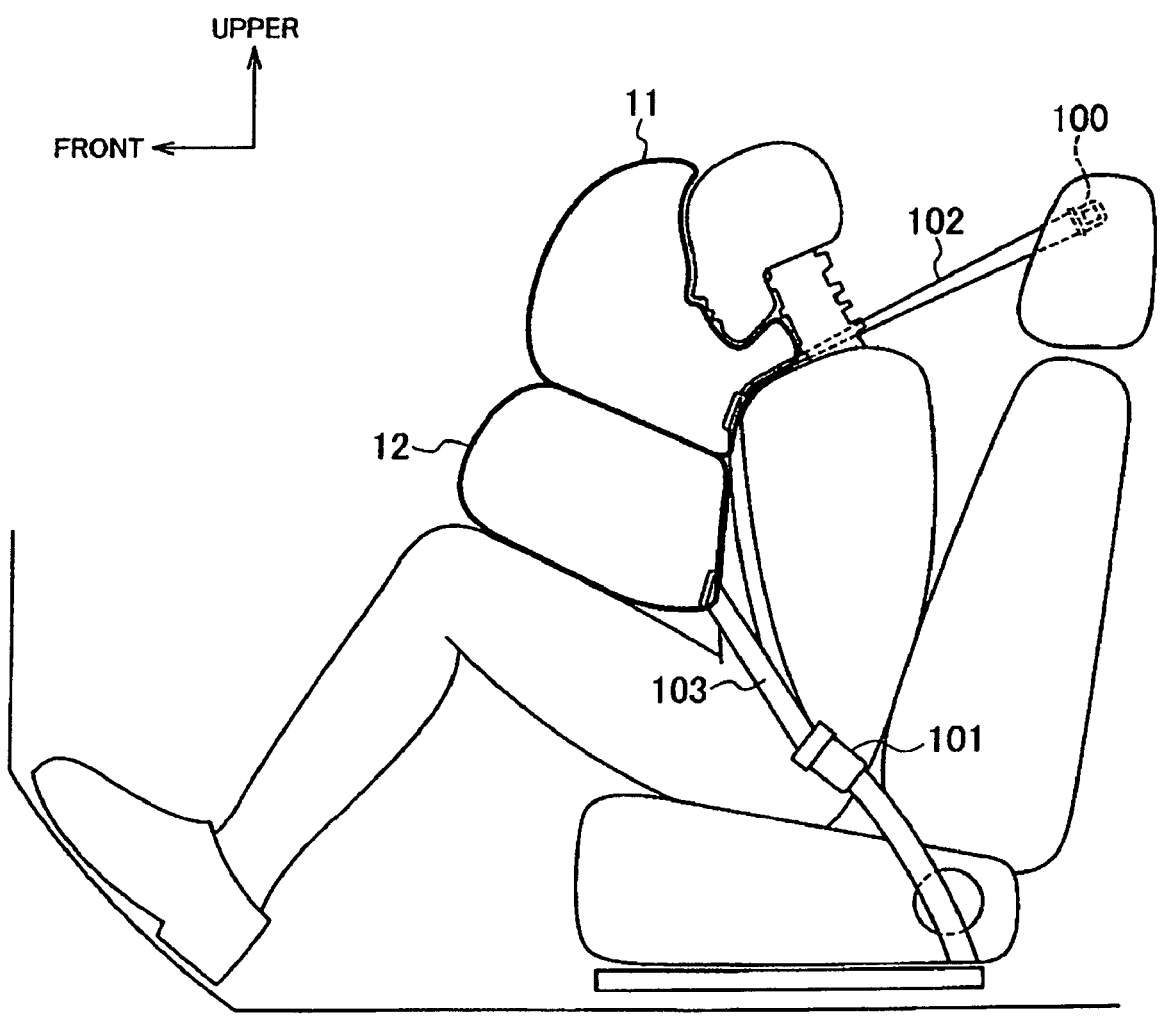
FIG. 2 is a diagram showing the constitution of the area around the seat of the passenger protective device pertaining to Embodiment 1.

FIG. 1 shows the constitution of the passenger protective device pertaining to Embodiment 1 of the present invention, and FIG. 2 shows the constitution of the area around the seat of the passenger protective device pertaining to Embodiment 1. As shown in FIG. 1, passenger protective device 1 protects the passenger by means of an airbag equipped in the seat belt and comprises head airbag 11, thigh airbag 12, head inflator 21, thigh inflator 22, control unit 30, impact sensor 40 and battery 50.

Head airbag 11 catches the passenger's head when deployed, as shown in FIG. 2. This head airbag 11 is equipped so that it is folded into the inside of shoulder belt 102, that passes from anchor portion 100 at the top rear of the passenger through the shoulder and chest portions and is fixed by buckle 101.

Thigh airbag 12 deploys so as to fill in the space from head airbag 11 to the passenger's thigh, as shown in FIG. 2, and supports the bottom of head airbag 11, which has caught the passenger's head. In addition, thigh airbag 12 is equipped so that it is folded into the inside of lap belt 103 that restrains the passenger's waist.

Head inflator 21 generates the gas that flows into head airbag 11. This head inflator 21 is equipped inside of buckle 101. The gas that is generated by head inflator 21 passes through a gas flow path formed inside of shoulder belt 102 and goes to head airbag 11.

Thigh inflator 22 generates the gas that flows into thigh airbag 12. This thigh inflator 22 is also equipped inside of buckle 101, as was the case with head inflator 21. The gas that is generated by thigh inflator 22 passes through a gas flow path formed inside of lap belt 103 and goes to thigh airbag 12.

Control unit 30 deploys head and thigh airbags 11 and 12. When control unit 30 deploys head and thigh airbags 11 and 12, it sends a gas-generating signal to head inflator 21 and thigh inflator 22. In this manner, inflators 21 and 22 receive the gas-generating signals and generate the gas.

Impact sensor 40 detects the impact applied to the vehicle. Also, control unit 30 constantly monitors the signals from impact sensor 40 and if the impact applied to the vehicle seems to have exceeded a fixed value according to the signal from impact sensor 40, it determines that the vehicle has crashed and sends a gas-generating signal to head inflator 21 and thigh inflator 22.

Battery 50 is constituted so as to supply electric power to control unit 30 when the ignition switch is ON. The positive terminal of battery 50 is connected to control unit 30 via the ignition switch, and the negative terminal is connected to the ground wire of control unit 30 and is also grounded to the body of the vehicle.

Furthermore, control unit 30 of the present embodiment makes the timing in which the internal pressure of the thigh airbag 12 peaks slower than the timing in which the internal pressure of the head airbag 11 peaks when deploying the head and thigh airbags 11 and 12. Also, control unit 30 makes the timing in which the capacity of the thigh airbag 12 reaches the maximum slower than the timing in which the capacity of the head airbag 11 reaches the maximum.

Figure 3A:
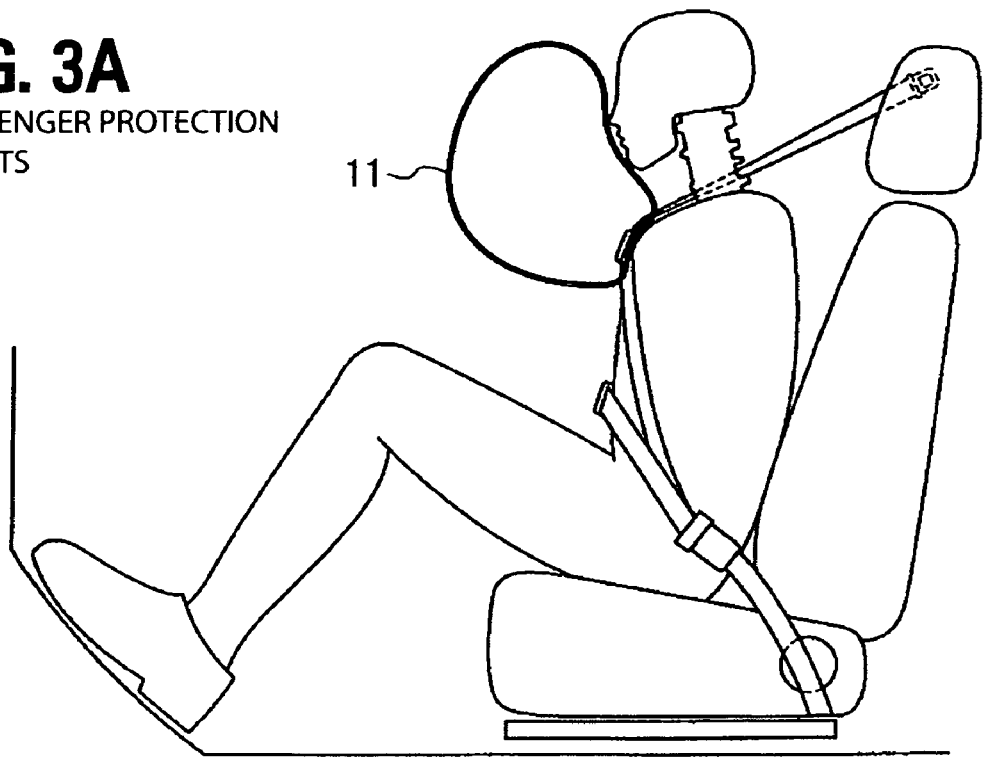
Figure 3B:
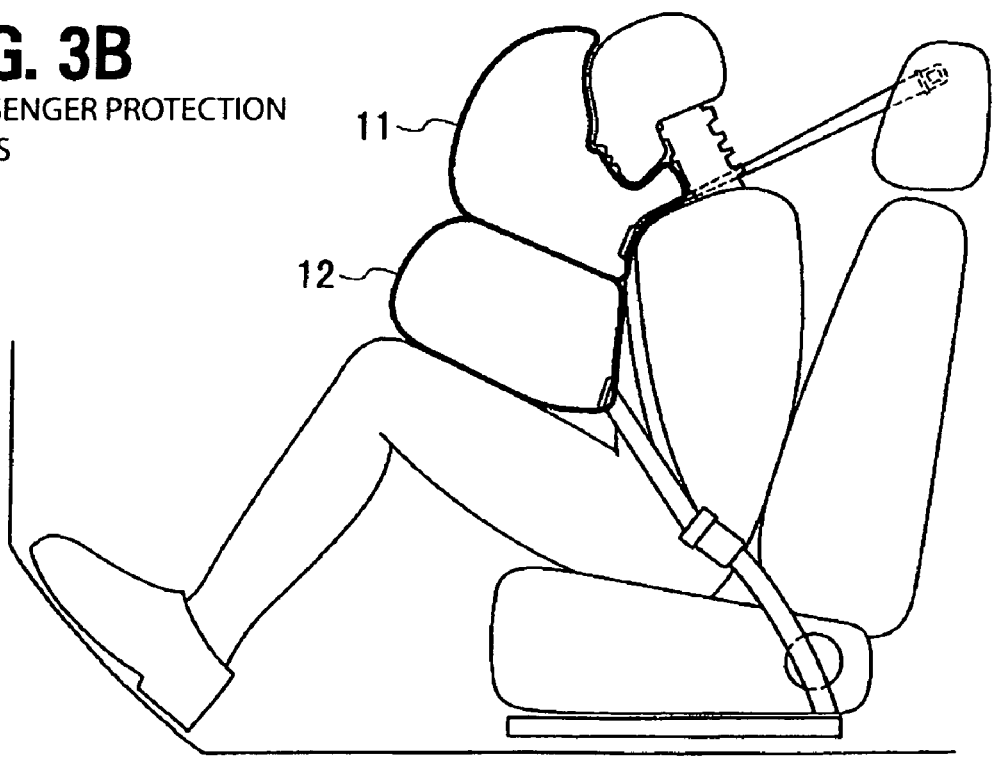

Next is provided an explanation of an overview of the passenger protective method pertaining to the present embodiment. FIG. 3 is an explanatory diagram of an overview of the passenger protective method pertaining to the present embodiment, and symbol (a) is an illustration of when the passenger protection starts and symbol (b) is an illustration of when the passenger protection ends. First, when the vehicle crashes, the vehicle passenger moves in a forward direction due to inertial force, but the passenger's body is restrained by the seatbelt. Due to this, the passenger's head reacts by turning in the forward direction.

In addition, when the vehicle crashes and impact sensor 40 detects an impact that exceeds a fixed value, control unit 30 sends a gas-generating signal to head inflator 21. Therefore, as shown in FIG. 3 (a), head airbag 11 is deployed and catches the passenger's head, which has moved due to inertial force.

Next, control unit 30 sends a gas-generating signal to thigh inflator 22. Therefore, as shown in FIG. 3 (b), thigh airbag 12 is deployed so as to fill in the space from head airbag 11 to the passenger's thigh, and both airbags 11 and 12 completely fill in the space between the passenger's head and thigh.

In this manner, for this device, the steering wheel is not needed to catch the passenger's head as it moves due to inertial force by way of the airbag when the vehicle crashes. Therefore, the inertial force that moves the passenger's head is caught by the passenger's body by way of the airbag, which completely fills in the space from the passenger's head to the thigh, and stable restraint of the head can be performed without relying on the position of the steering wheel.

Figure 4:
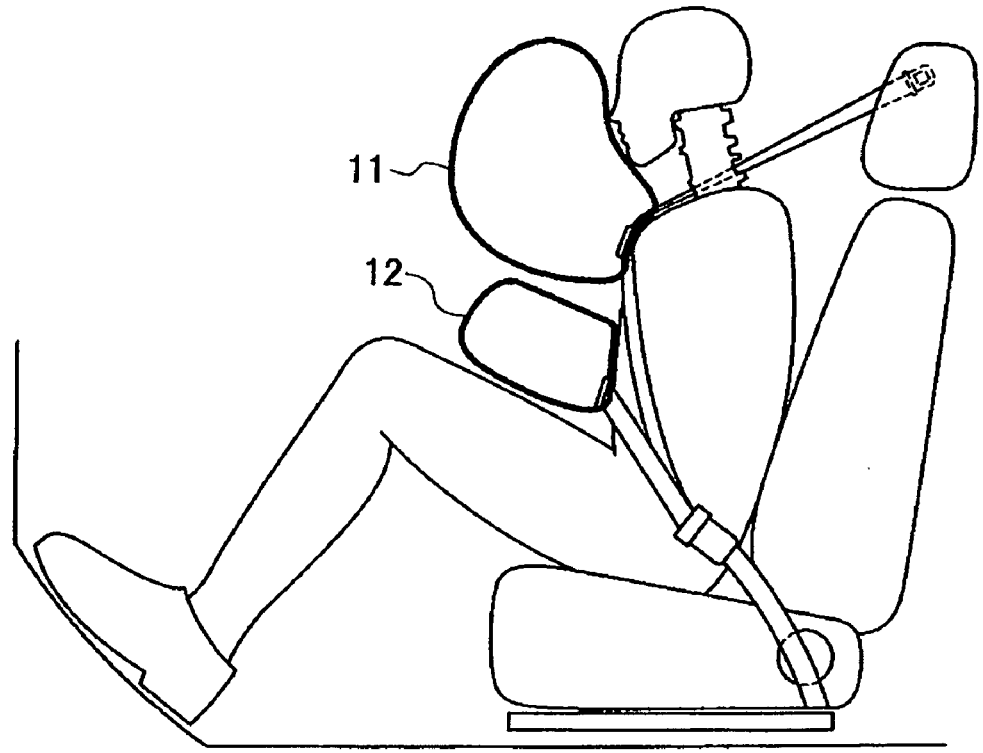
FIG. 4 is an explanatory diagram showing an overview of the passenger protective method pertaining to the present embodiment that shows the intermediate phase of the passenger protection.

FIG. 4 is an explanatory diagram of an overview of the passenger protective method pertaining to the present embodiment and shows the intermediate phase of the passenger protection. As explained above, control unit 30 deploys thigh airbag 12 slower than head airbag 11. Therefore, as shown in FIG. 4, the timing in which the capacity of thigh airbag 12 reaches the maximum is slower than the timing in which the capacity of head airbag 11 reaches the maximum. In other words, at the point as shown in FIG. 3 (b), thigh airbag 12 is softer than head airbag 11. Therefore, head airbag 11, which has caught the passenger's head, can easily penetrate into thigh airbag 12. Also, in regards to the process for which head airbag 11 penetrates into thigh airbag 12, the deployment of thigh airbag 12 is not completed, so the contact surface area between head airbag 11 and thigh airbag 12 increases. In addition, thigh airbag 12 is formed so as to encompass head airbag 11. Thus, the behavior of the top of the airbag becomes stable and the passenger's head can be caught softly, resulting in appropriate restraint of the passenger's head.

Although head airbag 11 easily penetrates into thigh airbag 12, it does not penetrate all the way through, but instead penetrates to a certain point in which thigh airbag 12 appropriately supports head airbag 11. In other words, as head airbag 11 penetrates thigh airbag 12, it increases the internal pressure of thigh airbag 12, and head airbag 11 penetrates to a certain point at which it is appropriately supported.

Figure 5:
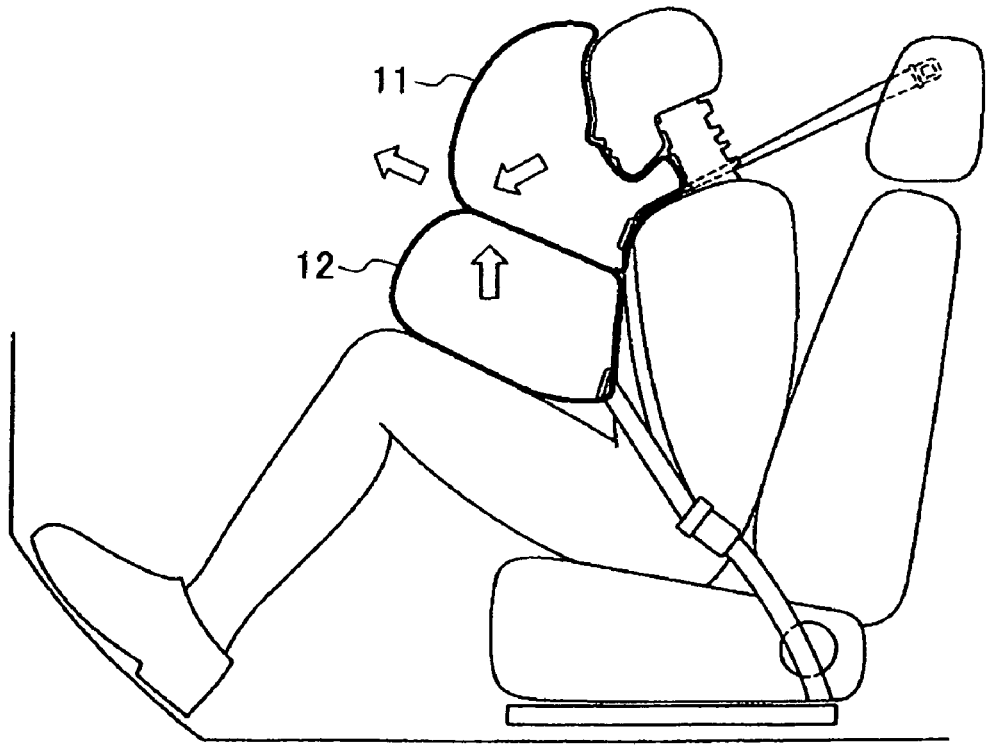
FIG. 5 is an explanatory diagram showing the circumstances for when the head airbag and thigh airbag are deployed at the same time.

FIG. 5 is an explanatory diagram showing the circumstances for when head airbag 11 and thigh airbag 12 are deployed at the same time. As shown in FIG. 5, even if head airbag 11 is supported by thigh airbag 12 when both airbags 11 and 12 are deployed at the same time, it is difficult for head airbag 11 to penetrate into thigh airbag 12. Therefore, the force that has caught the passenger's head escapes toward the front of the vehicle and stable restraint of the passenger's head cannot be performed, so it cannot be said that appropriate restraint of the passenger's head is provided.

Figure 6A:
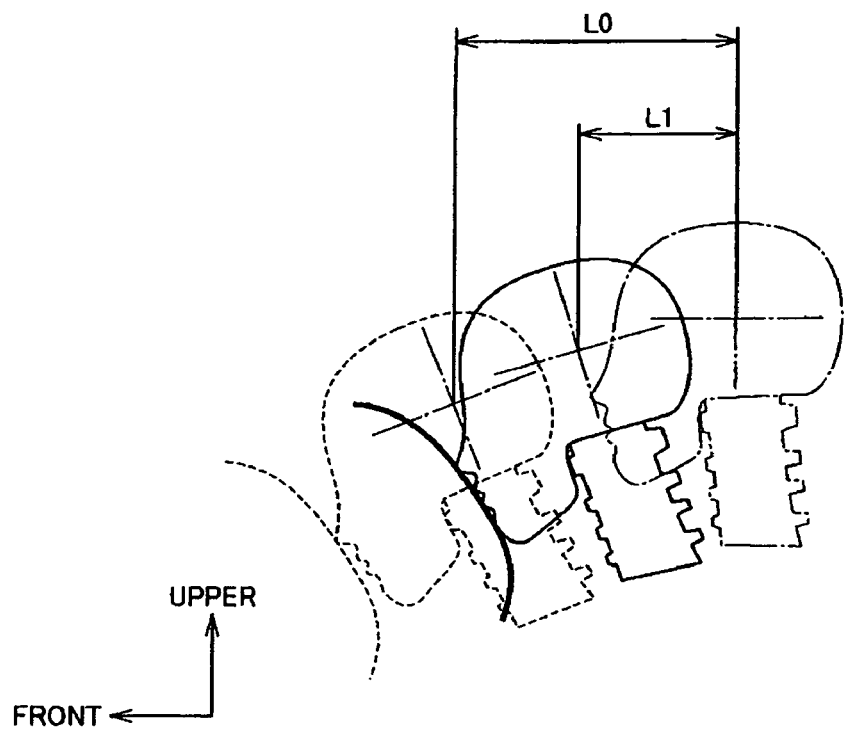
Figure 6B:
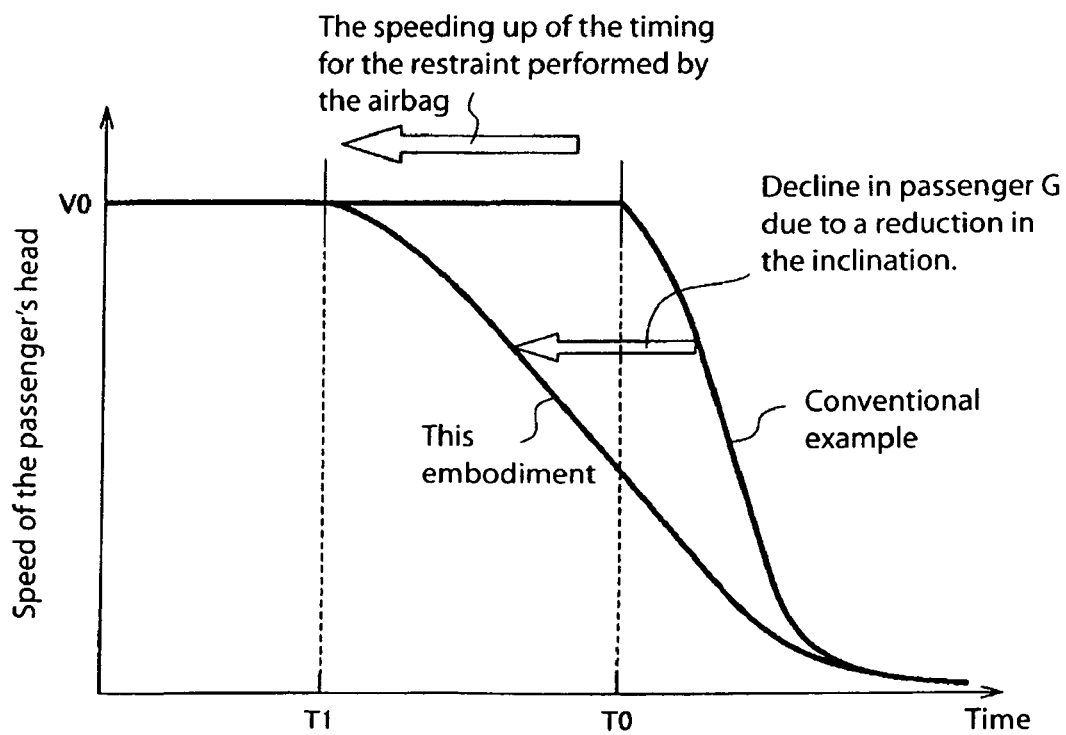

FIG. 6 is an explanatory diagram comparing the circumstances of the protection performed according to the passenger protective method of the present embodiment and the circumstances of the protection performed according to passenger protection carried out by means of an airbag equipped in the vicinity of the steering wheel. In the drawing, (a) shows the contact position between the passenger's head and the airbag, and (b) shows the speed of the passenger's head when protection of the passenger's head is performed. For the purposes of FIG. 6 (b), the vertical axis indicates the speed of the passenger's head, and the horizontal axis indicates the time that has elapsed from the occurrence of the crash.

As shown in FIG. 6 (a), for the airbag equipped in the vicinity of the steering wheel (hereafter referred to as the conventional example), the passenger's head is caught at the point at which it has moved for only a distance of L0. On the other hand, for the passenger protective device 1 of the present embodiment, since head airbag 11 equipped on the seatbelt deploys, the passenger's head is caught at the point at which is has moved for only a distance of L1 (a shorter distance than L0).

In addition, since the passenger's head is supported by the passenger's body by way of head airbag 11 when head airbag 11 deploys, it immediately begins restraining the passenger's head. Therefore, as shown in FIG. 6 (b), the restraining timing is made faster. In other words, for the conventional example, restraint of the passenger's head starts at the point at which the time reaches T0 from the occurrence of the crash, but for the present embodiment, restraint of the passenger's head begins at time TI, which is shorter than that.

Since the timing of this restraint is made faster, the speed V0 of the passenger's head, which moves due to inertial force, can be lowered to a slower speed compared to the conventional example. In other words, the passenger's head can be caught more softly in the present embodiment. In particular, if the passenger's head is caught softly, the contact surface area between the passenger's head and the head airbag 11 increases compared to the conventional example, so the load applied to the passenger's head can be dispersed. And, in addition, since head airbag 11 and thigh airbag 12 are used, the capacity of both of the airbags can be reduced, resulting in a reduction of the time required until deployment of the airbags is completed.

Figure 7:
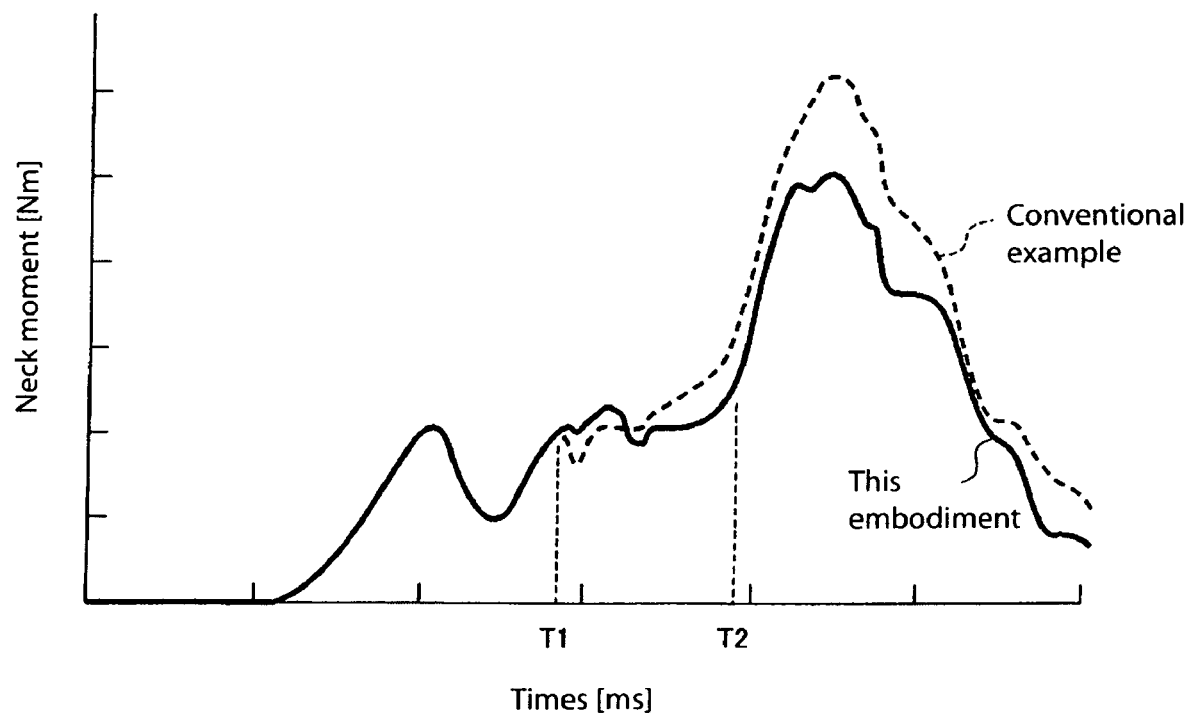
FIG. 7 is a graph showing the neck moment for when passenger protection is performed.

FIG. 7 is a graph showing the neck moment for when passenger protection is performed. The vertical axis in FIG. 7 indicates the neck moment [Nm] and the horizontal axis indicates the time [ms] that has elapsed since deployment of the airbag has started. For the passenger protective device 1 of the present embodiment, at time T1, head airbag 11 begins to interfere with thigh airbag 12. At this point, the neck moment for passenger protective device 1 of the present embodiment increases more than that for the conventional example. At time T1, head airbag 11 is in the midst of penetrating thigh airbag 12, and for this reason, the passenger's head is not supported very much by head airbag 11.

In this manner, the neck moment increases at time T1, but it decreases more than the conventional example at time T2. At time T2, head airbag 11 penetrates into thigh airbag 12 and the internal pressure of thigh airbag 12 increases, creating just enough reactive force to thigh airbag 12 to support head airbag 11, thus allowing for support of the passenger's head. After this, the neck moment reaches its peak, but this peak value is lower than the peak value for the conventional example. This is because the kinetic energy of the passenger's head is reduced more by the time it reaches the peak than for the conventional example. Therefore, based on the aforementioned explanation, it can be said that the passenger's head is more appropriately supported in the passenger protective device 1 of the present embodiment than in the conventional example.

Figure 8:
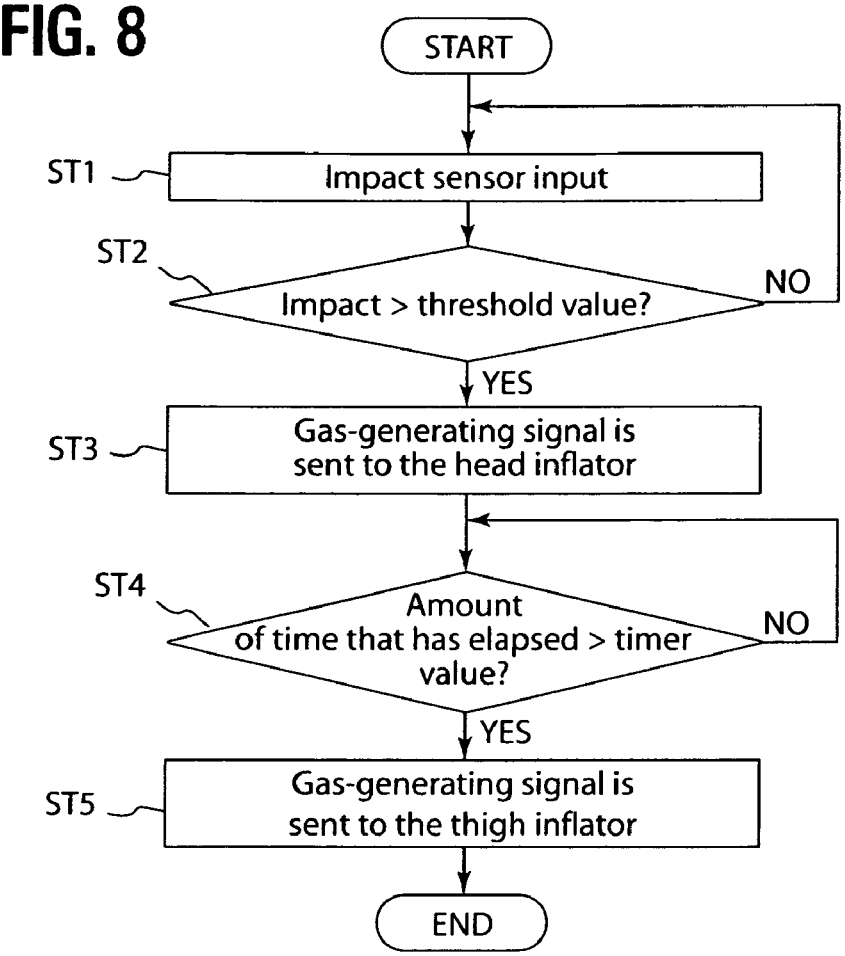
FIG. 8 is a flowchart showing the passenger protective method pertaining to the present embodiment.

Next is provided a detailed explanation of the passenger protective method pertaining to the present embodiment. FIG. 8 is a flowchart showing the passenger protective method pertaining to the present embodiment. When the vehicle ignition switch is turned ON, electric power is supplied to control unit 30, and the process for the flowchart shown in FIG. 8 is executed. Then, control unit 30 inputs the signal from impact sensor 40 (Step ST1).

Next, control unit 30 determines whether or not the impact determined according to the signal from impact sensor 40 exceeds the threshold value (Step ST2). At this point, if it is determined that it does not exceed the threshold value (ST2: NO), the process returns to Step ST1. On the other hand, if it is determined that it does exceed the threshold value (ST2: YES), control unit 30 sends a gas-generating signal to head inflator 21 (Step ST3).

Then, control unit 30 starts the timing. Control unit 30 then determines whether or not the amount of time elapsed has exceeded a predetermined timer value (Step ST4). At this point, if it is determined that it does not exceed the timer value (ST4:NO), this process is repeated until it is determined that it has exceeded the timer value. On the other hand, if it is determined that it does exceed the timer value (ST4:YES), control unit 30 sends a gas-generating signal to thigh inflator 22 (Step ST5). And then, the process is ended.

In this manner, for the passenger protective device and the method for Embodiment 1, the passenger's head is caught by head airbag 11 when it deploys, and thigh airbag 12 deploys so as to fill in the space from the deployed head airbag 11 to the passenger's thigh, so both airbags 11 and 12 fill in the space from the passenger's head to the thigh. Thus, the passenger's head, which moves due to inertial force when a crash occurs, is not caught by the steering wheel by way of the airbag, but is caught by the passenger's body by way of airbags 11 and 12, which have filled up the space from the passenger's head to the thigh. Therefore, a stable protective performance can be achieved even when deploying the airbag from the seatbelt.

In addition, the timing in which the internal pressure of thigh airbag 12 peaks is made slower than the timing in which the internal pressure of the head airbag peaks. And, the timing in which the volume of thigh airbag 12 reaches the maximum is made slower than the timing in which the capacity of head airbag 11 reaches the maximum. Therefore, head airbag 11 is supported by thigh airbag 12, which is softer than head airbag 11, and head airbag 11 can penetrate into thigh airbag 12 more easily. Due to this, the passenger's head can be caught softly. And, for this reason, appropriate restraint of the passenger's head can be performed.

Therefore, a stable protective performance can be achieved even when deploying the airbag from the seatbelt and the passenger's head can be appropriately restrained.

Next is provided an explanation of Embodiment 2 of the present invention. The passenger protective device pertaining to Embodiment 2 is the same as that for Embodiment 1, with the exception of a portion of the constitution and contents of the processing. The differences between Embodiment 2 and Embodiment 1 are explained below.

Figure 22:
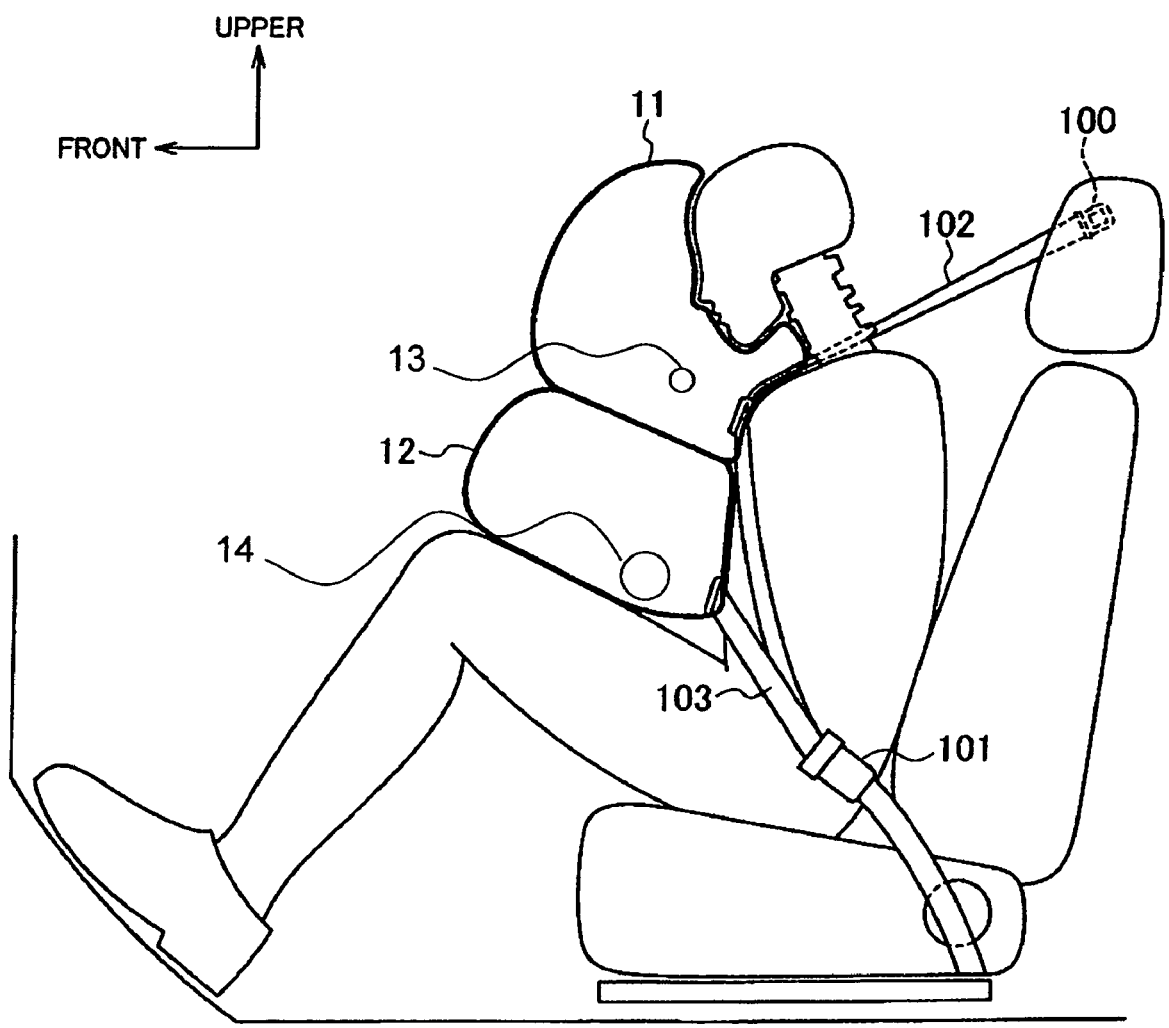
FIG. 22 is a diagram showing the constitution of the area around the seat for the passenger protective device pertaining to Embodiment 2.

First, for Embodiment 2, referring to FIG. 22, the vent hole 14 for thigh airbag 12 is made larger than the vent hole 13 for head airbag 11. In other words, if the diameter of the vent hole 13 for head airbag 11 is $\phi u$, and the diameter of the vent hole 14 for thigh airbag 12 is $\phi 1$, then $\phi u < \phi 1$. Therefore, the amount of exhaust is greater for thigh airbag 12 than for head airbag 11 and the internal pressure for thigh airbag 12 is smaller than the internal pressure for head airbag 11 when deployed.

Furthermore, for Embodiment 2, when the vehicle crashes, control unit 30 deploys both head airbag 11 and thigh airbag 12 at about the same time. In other words, control unit 30 does not set a time difference when deploying both airbag 11 and 12, which is different than what was done for Embodiment 1.

Figure 9:
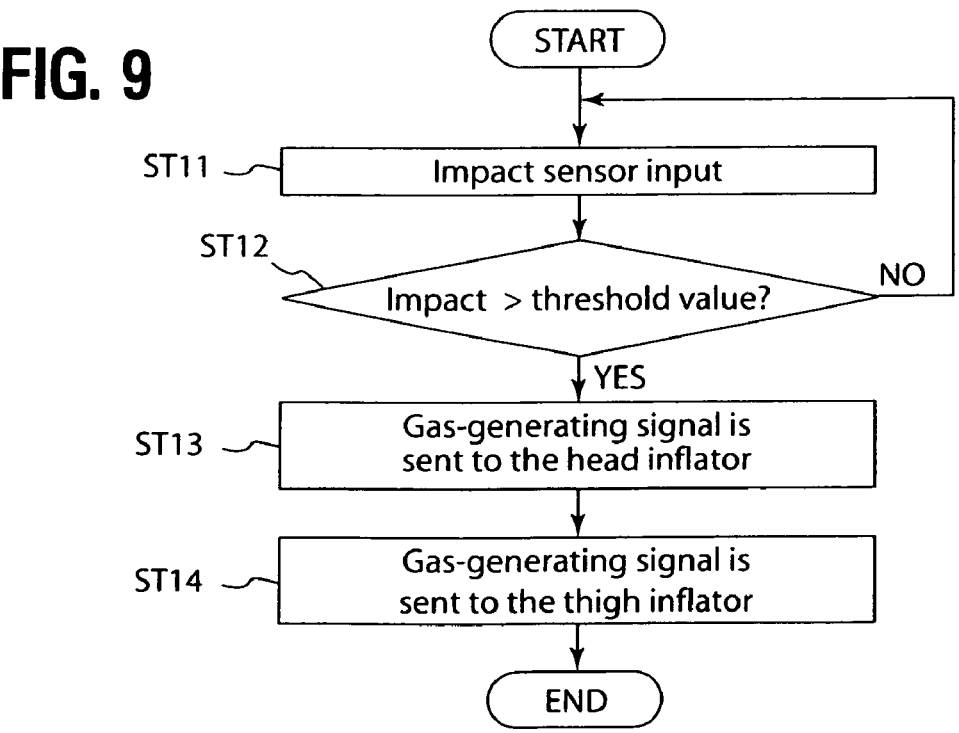
FIG. 9 is a detailed flowchart showing the passenger protective method pertaining to Embodiment 2.

FIG. 9 is a flowchart showing the detailed passenger protective method pertaining to Embodiment 2. As shown in FIG. 9, control unit 30 inputs the signal from impact sensor 40 (Step ST11), and determines whether or not the impact determined according to the signal from impact sensor 40 exceeds the threshold value (Step ST12). If it is determined that it does not exceed the threshold value (ST12:NO), the process is returned to Step ST1, and if it is determined that it does exceed the threshold value (ST12:YES), control unit 30 sends a gas-generating signal to head inflator 21 (Step ST13). Then, control unit 30 sends the gas-generating signal to thigh inflator 22 (Step ST14). And then, the process is ended.

In this manner, for Embodiment 2, head airbag 11 and thigh airbag 12 are deployed at approximately the same time. However, since the vent hole 14 for thigh airbag 12 is made larger than the vent hole 13 for head airbag 11, the internal pressure of thigh airbag 12 is lower than the internal pressure for head airbag 11. Therefore, head airbag 11, which has caught the passenger's head, easily penetrates into thigh airbag 12, a stable protective performance can be achieved, as was the case in Embodiment 1, and the passenger's head can be appropriately restrained.

Figure 10:
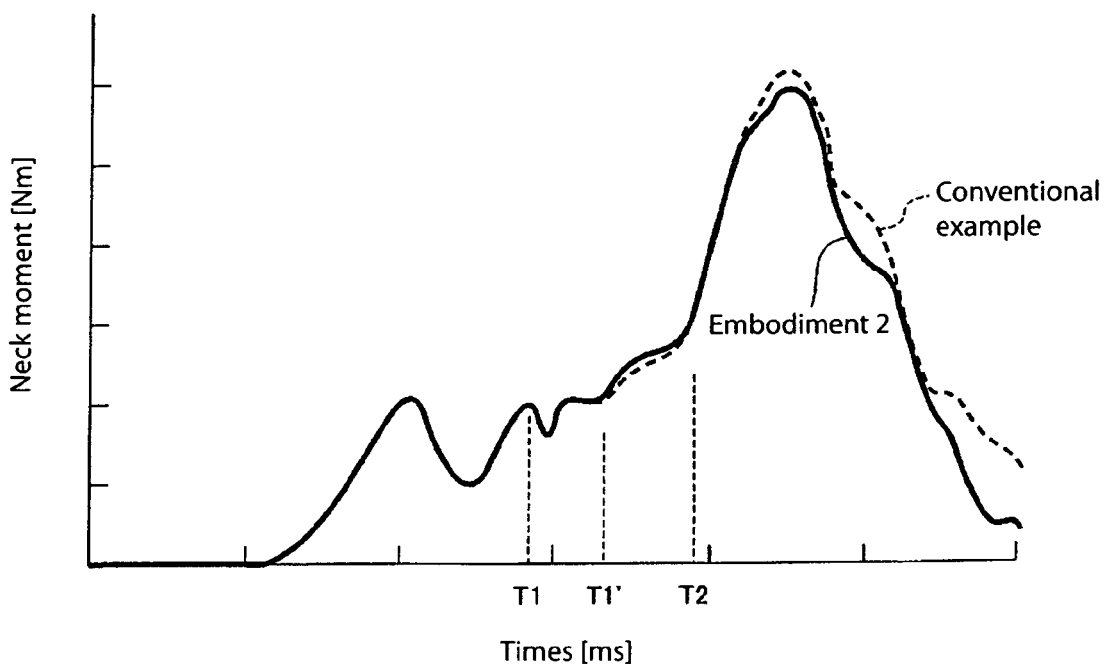
FIG. 10 is a graph showing the neck moment for when passenger protection is performed according to the passenger protective device pertaining to Embodiment 2.

FIG. 10 is a graph showing the neck moment for when passenger protection is performed for the passenger protective device 2 pertaining to Embodiment 2. For the purposes of FIG. 10, the vertical axis indicates the neck moment [Nm], and the horizontal axis indicates the time [ms] that has elapsed since deployment of the airbag has started. First, at time T1, head airbag 11 begins to interfere with thigh airbag 12. At this point, for Embodiment 2, since head airbag 11 and thigh airbag 12 are deployed at the same time, the internal pressure of both airbags 11 and 12 is high. In other words, head airbag 11 and thigh airbag 12 repel against one another, and as a result, head airbag 11 is not stable.

However, when the time becomes time T1', the gas inside of thigh airbag 12 passes through the vent hole 14 and is released, causing the internal pressure to drop. Due to this, head airbag 11 penetrates into thigh airbag 12. Thus, head airbag 11 stabilizes and the passenger's head can be appropriately restrained. As a result, as shown for time T2 and beyond, the kinetic energy of the passenger's head is appropriately absorbed, and the peak for the neck moment drops.

In this manner, according to the passenger protective device and method pertaining to Embodiment 2, the passenger's head is caught by head airbag 11 when it is deployed, and thigh airbag 12 deploys so as to fill in the space from deployed head airbag 11 to the passenger's thigh, so both airbags 11 and 12 fill in the space between the passenger's head and thigh. Therefore, the passenger's head, which moves when the vehicle collides due to inertial force, is not caught by the steering wheel via the airbag, but is caught by the passenger's body by means of airbags 11 and 12 that have filled in the space from the passenger's head to the thigh. Thus, a stable protective performance can be achieved even when deploying the airbag from the seatbelt.

Furthermore, the internal pressure of thigh airbag 12 is made to be lower than the internal pressure for head airbag 11. Therefore, head airbag 11 is supported by thigh airbag 12, which is softer than head airbag 11, so head airbag 11 easily penetrates into thigh airbag 12. Therefore, the passenger's head can be caught softly. And, as a result, the passenger's head can be appropriately restrained.

Therefore, a stable protective performance can be achieved even when deploying the airbag from the seatbelt and the passenger's head can be appropriately restrained.

In addition, the vent hole 14 for thigh airbag 12 is made larger than the vent hole 13 for head airbag 11. Therefore, the amount of exhaust is greater for thigh airbag 12 than for head airbag 11. And, as a result, and the internal pressure for thigh airbag 12 can easily be made lower than the internal pressure for head airbag 11.

Next is provided an explanation for Embodiment 3. The passenger protective device pertaining to Embodiment 3 is the same as that for Embodiment 1 with the exception of a portion of the constitution and contents of the processing. The differences between Embodiment 3 and Embodiment 1 are explained below.

First, for Embodiment 3, the vent hole 14 for thigh airbag 12 is made larger than the vent hole 13 for head airbag 11, as was the case for Embodiment 2. On the other hand, control unit 30 sets a time difference, as was the case for Embodiment 1, and deploys both airbags 11 and 12. Due to this, the effects of both Embodiment 1 and Embodiment 2 can be achieved.

Figure 11:
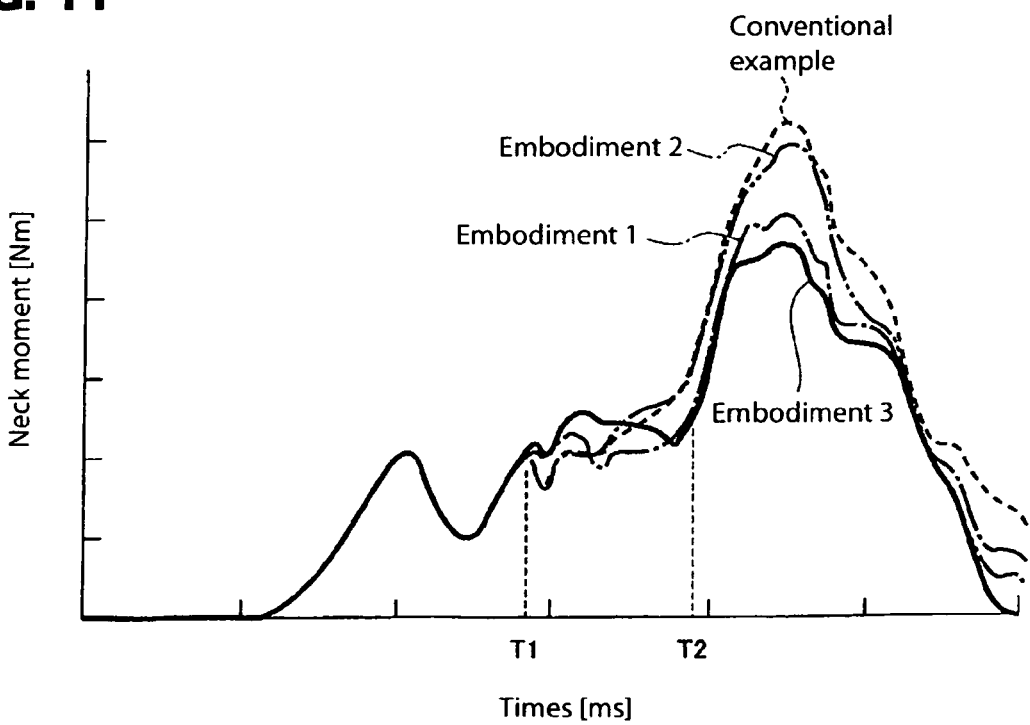
FIG. 11 is a graph showing the neck moment for when passenger protection is performed according to the passenger protective device pertaining to Embodiment 3.

FIG. 11 is a graph showing the neck moment for when passenger protection is performed for the passenger protective device 3 pertaining to Embodiment 3. For the purposes of FIG. 11, the vertical axis indicates the neck moment [Nm], and the horizontal axis indicates the time [ms] that has elapsed since deployment of the airbag has started. As shown in FIG. 11, for the passenger protective device 3 pertaining to Embodiment 3, head airbag 11 and thigh airbag 12 interfere with one another at time T1.

In addition, the neck moment increases after time T1, compared to Embodiment 1. This is because thigh airbag 12 is deployed slower than head airbag 11, and the vent hole 14 for thigh airbag 12 is expanded, so head airbag 11 can penetrate into thigh airbag 12 even more easily. In other words, not enough reactive force is generated by thigh airbag 12 to support head airbag 11, and for this reason, it becomes more difficult to suppress the turning of the passenger's head in the forward direction.

However, since it became even easier for head airbag 11 to penetrate into thigh airbag 12, when enough reactive force was generated by thigh airbag 12 to support head airbag 11, the behavior of head airbag 11 stabilized and the restraining efficiency became even greater. As a result, as indicated by time T2 and beyond, the kinetic energy of the passenger's head was even more appropriately absorbed, and the peak of the neck moment dropped even further.

In this manner, according to the passenger protective device and method pertaining to Embodiment 3, the passenger's head is caught by head airbag 11 when it is deployed, and thigh airbag 12 deploys so as to fill in the space from the deployed head airbag 11 to the passenger's thigh, so both airbags 11 and 12 fill in the space between the passenger's head and thigh. Due to this, the passenger's head, which moves due to inertial force when the vehicle crashes, is not caught by the steering wheel by way of the airbag, but is caught by the passenger's body by way of airbags 11 and 12, which have filled up the space from the passenger's head to the thigh. Therefore, a stable protective performance can be achieved even when deploying the airbag from the seatbelt.

Furthermore, the timing in which the internal pressure of thigh airbag 12 peaks is made slower than the timing in which the internal pressure of head airbag 11 peaks. Also, the timing in which the capacity of thigh airbag 12 reaches the maximum is made slower than the timing in which the capacity of head airbag 11 reaches the maximum. Because of this, head airbag 11 is supported by thigh airbag 12, which is softer than head airbag 11, so head airbag 11 can easily penetrate into thigh airbag 12. Therefore, the passenger's head can be caught softly. And, as a result, the passenger's head can be appropriately restrained.

In addition, the internal pressure of thigh airbag 12 is made lower than the internal pressure of head airbag 11. Therefore, head airbag 11 is supported by thigh airbag 12, which is much softer than head airbag 11, so head airbag 11 can penetrate thigh airbag 12 much more easily. Therefore, the passenger's head can be caught softly. And, as a result, the passenger's head can be appropriately restrained.

Therefore, a stable protective performance can be achieved even when deploying the airbag from the seatbelt and the passenger's head can be more appropriately restrained.

In addition, as was the case for Embodiment 2, the internal pressure for thigh airbag 12 can be more easily lowered than the internal pressure for head airbag 11.

Next is provided an explanation of Embodiment 4 of the present invention. The passenger protective device pertaining to Embodiment 4 is the same as that for Embodiment 1, the only difference being that the timing in which the airbags are deployed is even more appropriately performed than in Embodiment 1. Below is provided an explanation of the differences in Embodiment 4 and Embodiment 1.

First, the time from when gas begins to flow into the airbag until the internal pressure of the airbag peaks, or the time from when gas begins to flow into the airbag until the capacity of the airbag reaches the maximum is prescribed as Tu for head airbag 11 and TI for thigh airbag 12. Then, for Embodiment 4, the timing in which gas begins to flow into thigh airbag 12 is made slower than the timing in which gas begins to flow into head airbag 11 by just the amount of time that is longer than Tu−TI.

Here, aforementioned times Tu and TI can be obtained as shown below. In other words, they can be obtained from the relationship according to the formula below.

$$Tu = f(Vu/Ou)$$

$$TI = f(VI/OI)$$

Vu is the volume of head airbag 11 and Ou is the output of head inflator 21. Also, VI is the volume of thigh airbag 12, and OI is the output of thigh inflator 22.

Figure 12:
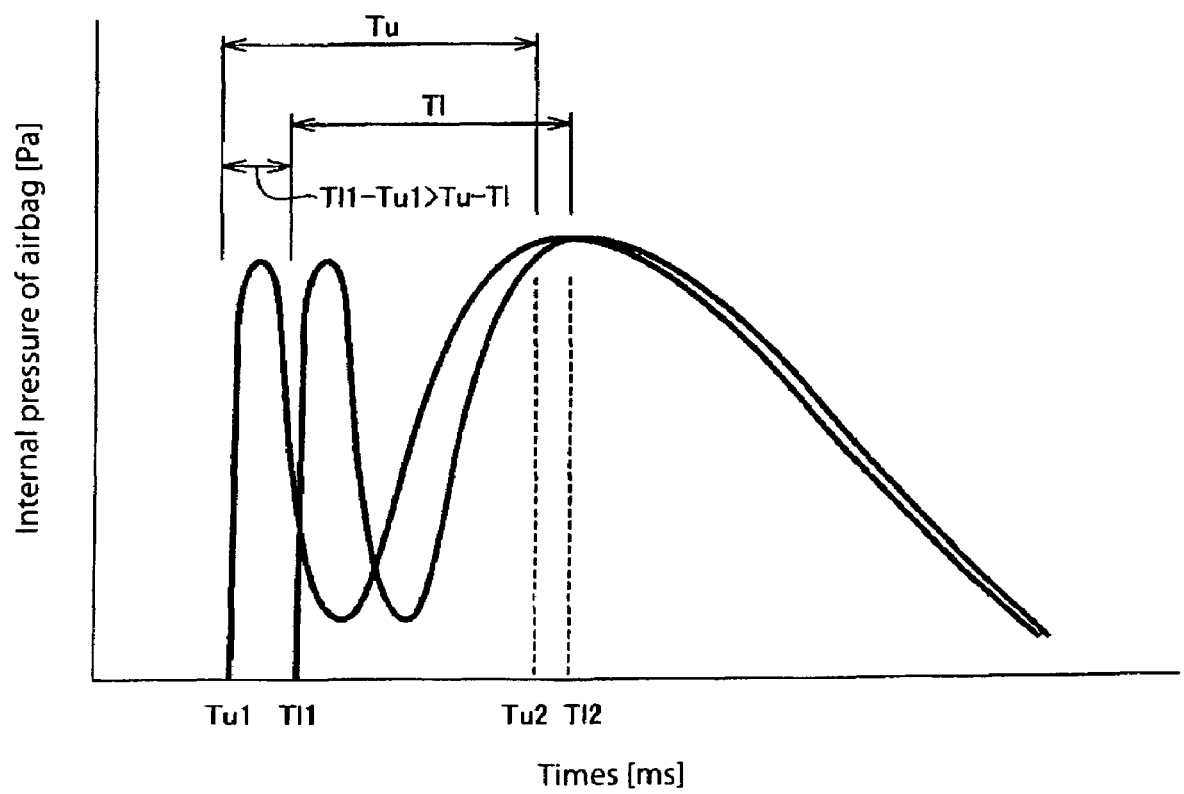
FIG. 12 is an explanatory diagram showing the internal pressure of the airbag.

FIG. 12 is an explanatory diagram showing the internal pressure of the airbag. As shown in this drawing, at time Tu1, gas is sent from head inflator 21 to head airbag 11. Next, at time TI1, gas is sent from thigh inflator 22 to thigh airbag 12.

At the point in time of Tu2 when the time only elapses from time Tu1 to Tu, the internal pressure of head airbag 11 reaches the maximum. After this, at the point in time of TI2 when the time only elapses from time TI1 to TI, the internal pressure of thigh airbag 12 reaches the maximum. Here, the difference in time from time Tu1 to time TI1 is made larger than Tu−TI. Therefore, the internal pressure of thigh airbag 12 always reaches the maximum later than that of head airbag 11. In this manner, for Embodiment 4, the timing in which the capacity of thigh airbag 12 reaches the maximum is always made slower than the timing in which the capacity of head airbag 11 reaches the maximum.

In this manner, according to the passenger protective device 4 and the method pertaining to Embodiment 4, a stable protective performance can be achieved even when deploying the airbag from the seatbelt, as was the case with Embodiment 1, and the passenger's head can be appropriately restrained.

Furthermore, for Embodiment 4, the time from when gas begins to flow into the airbag until the internal pressure of the airbag peaks, or the time from when gas reaches to flow into the airbag until the capacity of the airbag reaches the maximum is prescribed as Tu for head airbag 11 and TI for thigh airbag 12. And, the timing in which gas begins to flow into thigh airbag 12 is made slower than the timing in which gas begins to flow into head airbag 11 for the amount of time that is longer than Tu−TI. Therefore, the timing in which the internal pressure of thigh airbag 12 peaks and the timing in which its capacity reaches the maximum can be made slower than that of head airbag 11. And, in addition, if the timing in which the gas begins to flow is set as described above, even if the airbag specification changes, appropriate timing can be realized.

Next is provided an explanation of Embodiment 5 of the present invention. The passenger protective device pertaining to Embodiment 5 is the same as that pertaining to Embodiment 1, the only difference being that the output from inflators 21 and 22 is set more appropriately than that in Embodiment 1. Below is provided an explanation of the difference between Embodiment 1 and Embodiment 5.

According to the passenger protective device 5 pertaining to Embodiment 5, the output for inflators 21 and 22 is set so that the internal pressure of thigh airbag 12 is lower than the internal pressure of head airbag 11. Here, the internal pressure of the airbags is determined according to the capacity of the airbags and the output from the inflators. Therefore, the output from both inflators 21 and 22 can easily be set based on the capacity ratio of the airbags, which is already known.

More specifically, the volume of head airbag 11 is prescribed as Vu and the output of head inflator 21 is prescribed as Ou. So, if the volume of thigh airbag 12 is prescribed as VI, and the output of thigh inflator 22 is prescribed as OI, the relationship between the internal pressure Pu of head airbag 11 and the internal pressure PI of thigh airbag 12 can be expressed according to the following formula.

$$Pu = g(Ou/Vu)$$

$$PI = g(OI/VI)$$

For the purposes of the present embodiment, the output of inflators 21 and 22 is set so that PI<Pu, so the output of thigh inflator 22 is set as OI<Ou×(Vu/VI).

Figure 13A:
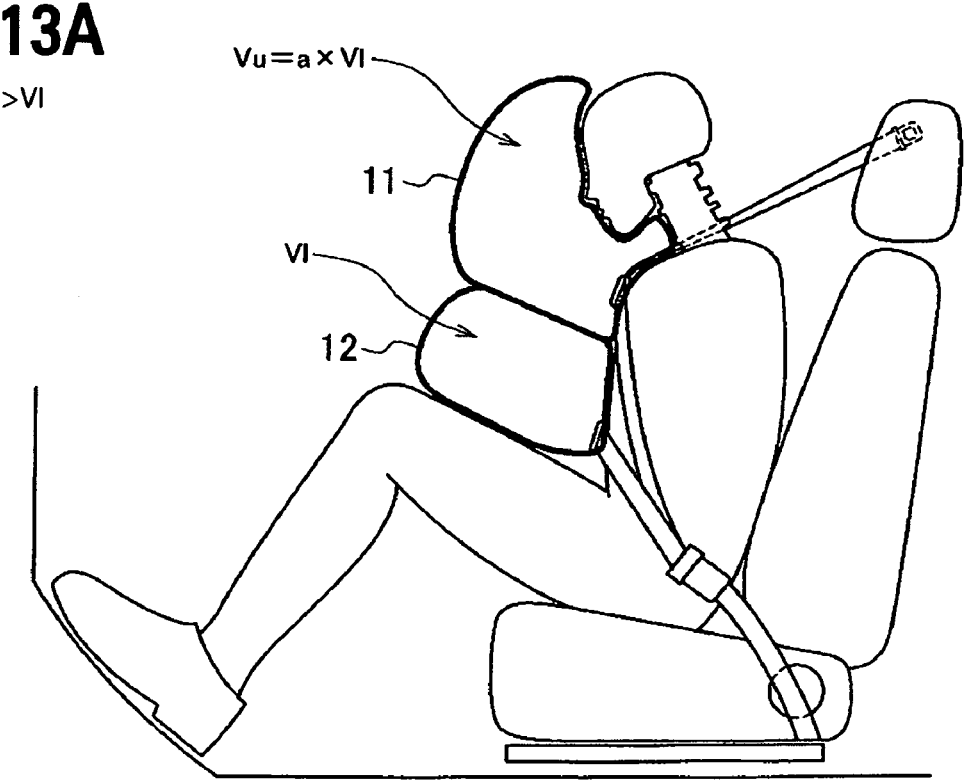
Figure 13B:
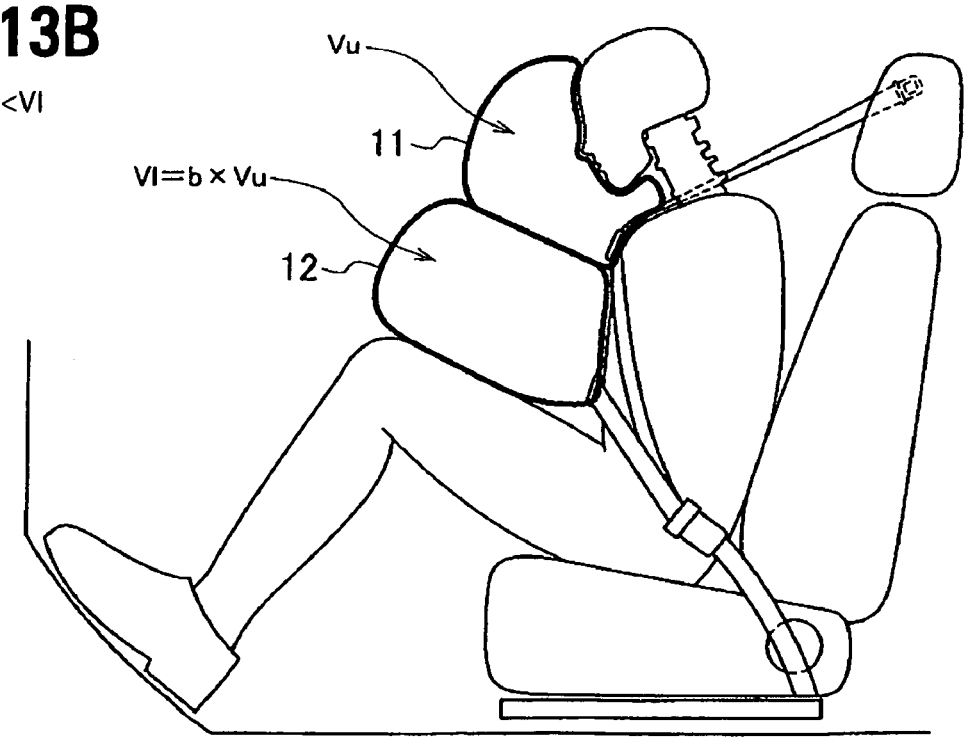

FIG. 13 is an explanatory diagram showing the method used to set the output for inflators 21 and 22 pertaining to Embodiment 5. In the drawing, (a) shows an example for when head airbag 11 is larger than thigh airbag 12, and (b) shows an example for when head airbag 11 is smaller than thigh airbag 12.

First, as shown in FIG. 13 (a), head airbag 11 is larger than thigh airbag 12, and volume Vu of head airbag 11 is "a" times the volume VI of thigh airbag 12 (a is a number exceeding 1). In this case, the output of thigh inflator 22 is set so that $$OI < Ou \times a.$$

Also, as shown in FIG. 13 (b), head airbag 11 is smaller than thigh airbag 12, and volume VI of thigh airbag 12 is "b" times the volume Vu of head airbag 11 (b is a number exceeding 1). In this case, the output of thigh inflator 22 is set so that OI<Ou/b.

In this manner, according to the passenger protective device 5 and the method pertaining to Embodiment 5, a stable protective performance can be achieved even when deploying the airbag from the seatbelt, as was the case in Embodiment 1, and the passenger's head can be appropriately restrained.

Furthermore, according to Embodiment 5, the output for inflators 21 and 22 is set so that the internal pressure of the airbag, which is determined from the capacity of the airbag and the output from the inflator, is lower for thigh airbag 12 than for head airbag 11. Therefore, the internal pressure of thigh airbag 12 can reliably be made lower than the internal pressure of head airbag 11.

Next is provided an explanation of Embodiment 6. The passenger protective device pertaining to Embodiment 6 is the same as that pertaining to Embodiment 2, with the exception of a portion of the constitution and contents of the processing. Below is provided an explanation of the difference between Embodiment 2 and Embodiment 6.

Figure 14:
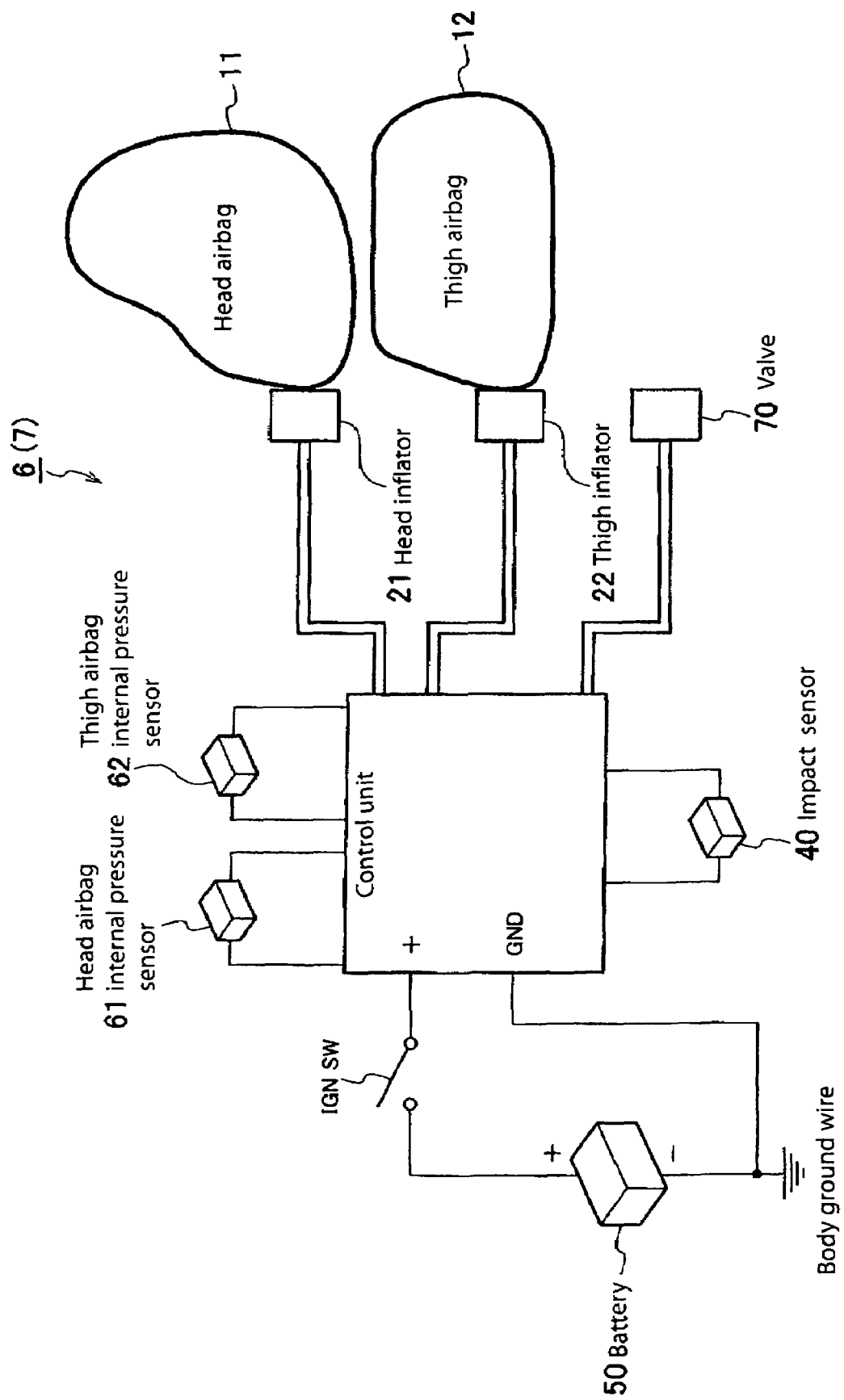
FIG. 14 is a diagram showing the constitution of the passenger protective device pertaining to Embodiment 6.

FIG. 14 shows the constitution of the passenger protective device pertaining to Embodiment 6. As shown in the drawing, the passenger protective device 6 pertaining to Embodiment 6 further comprises head airbag internal pressure sensor 61 (head airbag internal pressure detection means), thigh airbag internal pressure sensor 62 (thigh airbag internal pressure detection means), and valve 70 (inflowing gas control means).

Head airbag internal pressure sensor 61 detects the internal pressure of head airbag 11, and thigh airbag internal pressure sensor 62 detects the internal pressure of thigh airbag 12. Valve 70 controls the amount of gas that flows into at least one of airbags 11 and 12 when head airbag 11 and thigh airbag 12 are deployed.

Figure 15A:
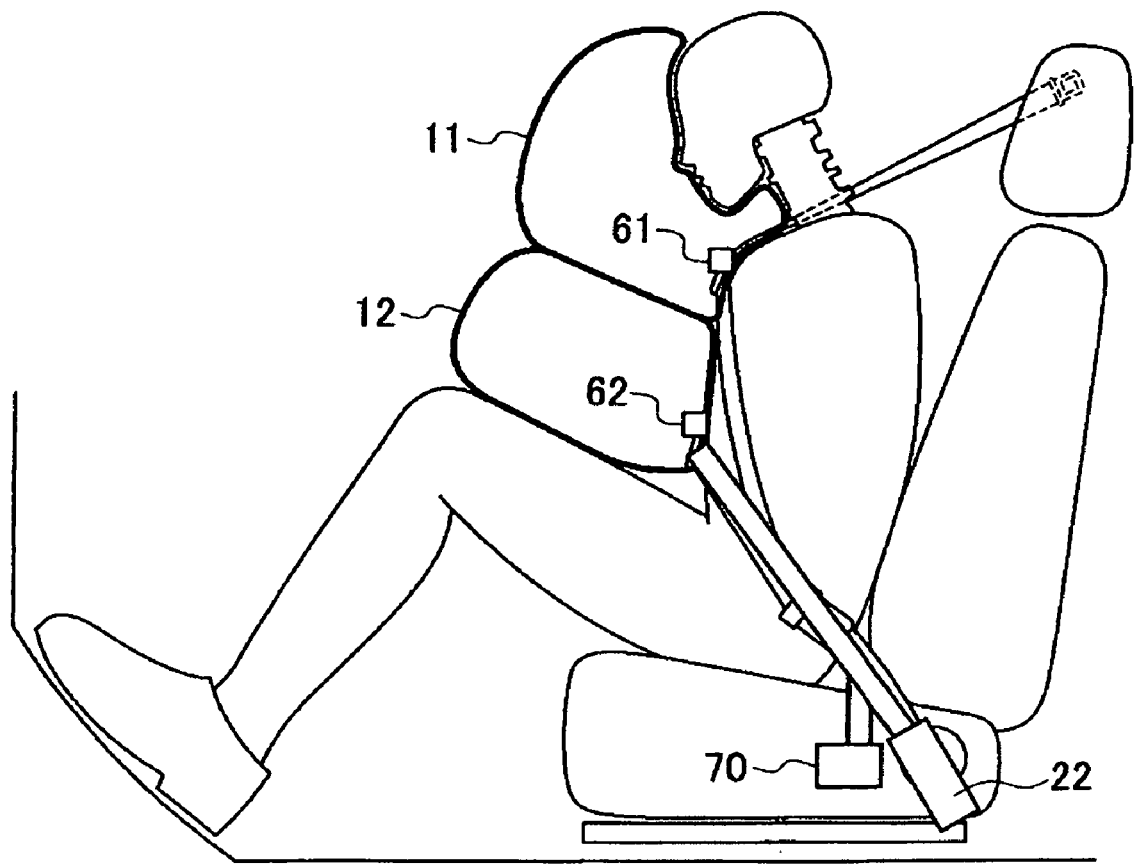
Figure 15B:
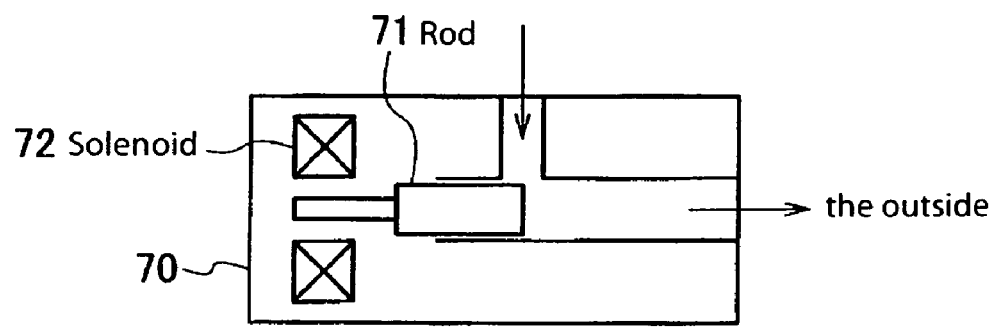

FIG. 15 shows the detailed constitution of internal pressure sensors 61 and 62 and valve 70, which were shown in FIG. 14. In this drawing, (a) shows the area around the seat, and (b) is a detailed illustration of valve 70. As shown in FIG. 15 (a), head airbag internal pressure sensor 61 is installed so that it gets positioned inside of head airbag 11 when head airbag 11 deploys. Similarly, thigh airbag internal pressure sensor 62 is installed so that it gets positioned inside of thigh airbag 12 when thigh airbag 12 deploys.

For Embodiment 6, thigh inflator 22 is placed at the lower portion of the seat side and supplies the gas that is generated to thigh airbag 12. Also, the flow path that goes from thigh inflator 22 to thigh airbag 12 is diverged and connected to valve 70. As shown in FIG. 15 (b), valve 70 forms a flow path that exhausts the gas generated by thigh inflator 22 to the outside, which consists of rod 71 that opens and closes the flow path and solenoid 72 that performs the open and close operation for rod 71. After electric current is transmitted to solenoid 72, rod 71 is moved toward the opened direction of the flow path to open the flow path. As a result, the amount of gas that flows from thigh inflator 22 into thigh airbag 12 can be controlled.

By using this type of constitution, control unit 30 makes gas flow into airbags 11 and 12 from inflators 21 and 22 when the vehicle crashes and reads the value detected by both internal pressure sensors 61 and 62. Then, control unit 30 controls the volume of inflowing gas so that the internal pressure PI of thigh airbag 12 is lower than the internal pressure Pu of head airbag 11.

Figure 16:
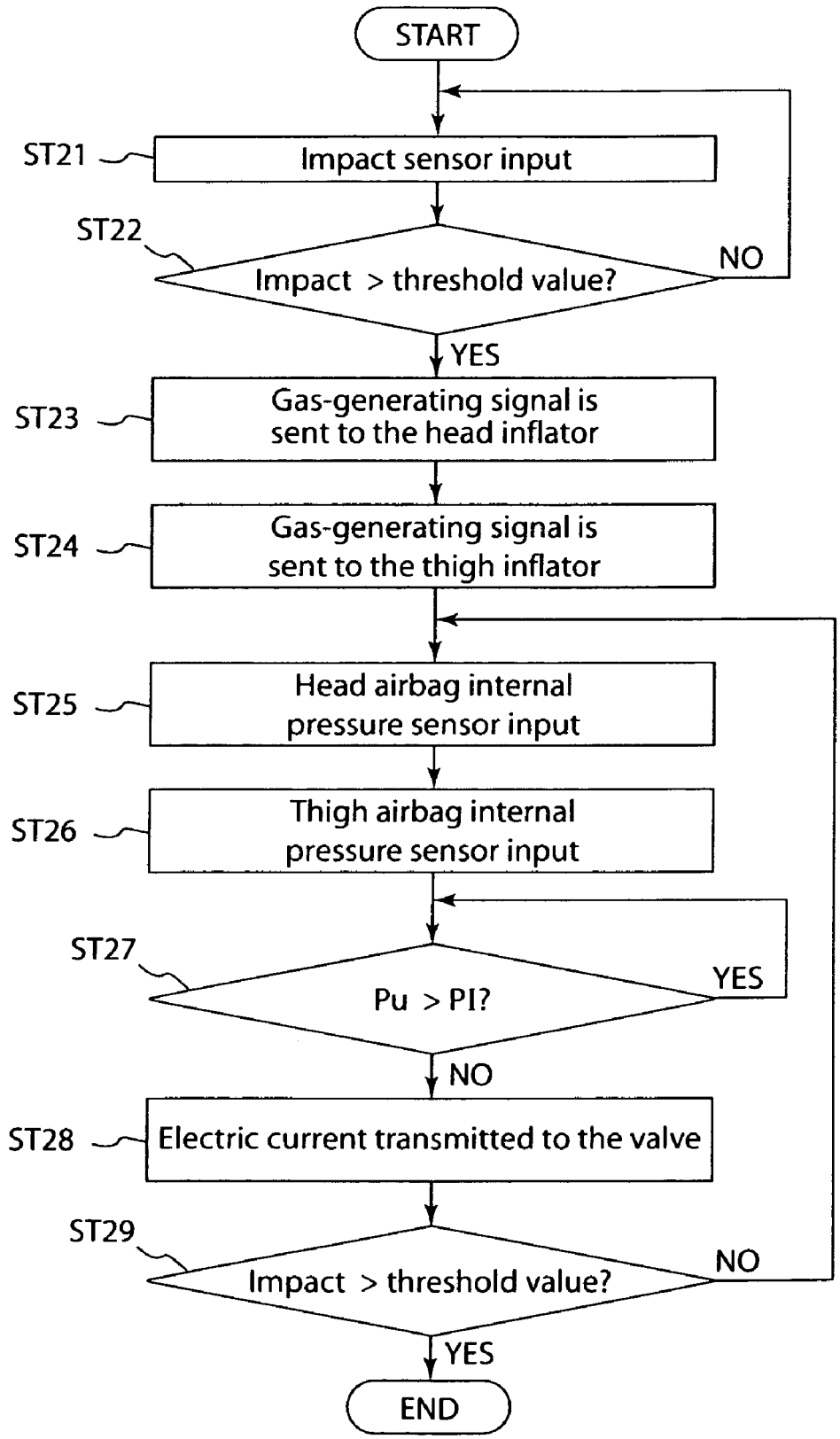
FIG. 16 is a flowchart showing the passenger protective method pertaining to Embodiment 6.

FIG. 16 is a flowchart showing the passenger protective method pertaining to Embodiment 6. The process for Steps ST21~ST24 shown in FIG. 16 is the same as for Steps ST11~ST14 shown in FIG. 9, so the explanation for these steps has been omitted.

After the gas-generating signal is sent to inflators 21 and 22 (after Steps ST23 and ST24), control unit 30 inputs the signal from head airbag internal pressure sensor 61 (Step ST25). Then, control unit 30 inputs the signal from thigh airbag internal pressure sensor 62 (Step ST26).

Next, control unit 30 determines whether or not the internal pressure Pu for head airbag 11 that was determined by the signal from head airbag internal pressure sensor 61 is greater than the internal pressure PI for thigh airbag 12 that was determined by the signal from thigh airbag internal pressure sensor 62 (Step ST27). If it determines that the internal pressure Pu for head airbag 11 is greater than the internal pressure PI for thigh airbag 12 (ST27: YES), the process proceeds to Step ST29.

On the other hand, if it determines that the internal pressure Pu for head airbag 11 is not greater than the internal pressure PI for thigh airbag 12 (ST27: NO), control unit 30 transmits electric current to valve 70 (Step ST28). Therefore, control unit 30 opens the flow path inside of valve 70 and reduces the amount of gas that flows into thigh airbag 12 from inflator 22.

After this takes place, control unit 30 determines whether or not the impact determined according to the signal from impact sensor 40 is below the threshold value (Step ST29). At this point, if it is determined that it is not below the threshold value (ST29: NO), the control unit can determine that the vehicle is in the midst of a collision, so the process returns to Step ST25. On the other hand, if it is determined that it is below the threshold value (ST29: YES), the process is ended.

In this manner, according to passenger protective device 6 and the method pertaining to Embodiment 6, a stable protective performance can be achieved even when deploying the airbag from the seatbelt, as was the case in Embodiment 2, and the passenger's head can be appropriately restrained.

Furthermore, according to Embodiment 6, the volume of inflowing gas can be controlled by making the internal pressure of thigh airbag 12 smaller than the internal pressure of head airbag 11. Therefore, the internal pressure of thigh airbag 12 can easily and reliably be made lower than the internal pressure of head airbag 11.

For Embodiment 6, although the volume of gas that flowed into thigh airbag 12 was controlled, control is not restricted to such a method and the volume of gas flowing into head airbag 11 can also be controlled, or the volume of gas flowing into both airbags 11 and 12 can be controlled.

Next is provided an explanation of Embodiment 7. The passenger protective device pertaining to Embodiment 7 is the same as that pertaining to Embodiment 6, with the exception of a portion of the constitution and contents of the processing. Below is provided an explanation of the difference between Embodiment 6 and Embodiment 7.

First, for passenger protective device 6 pertaining to Embodiment 6, the amount of gas that flowed into the airbag was controlled. Conversely, for passenger protective device 7 pertaining to Embodiment 7, the volume of gas that flows out of the airbag is controlled.

Figure 17A:
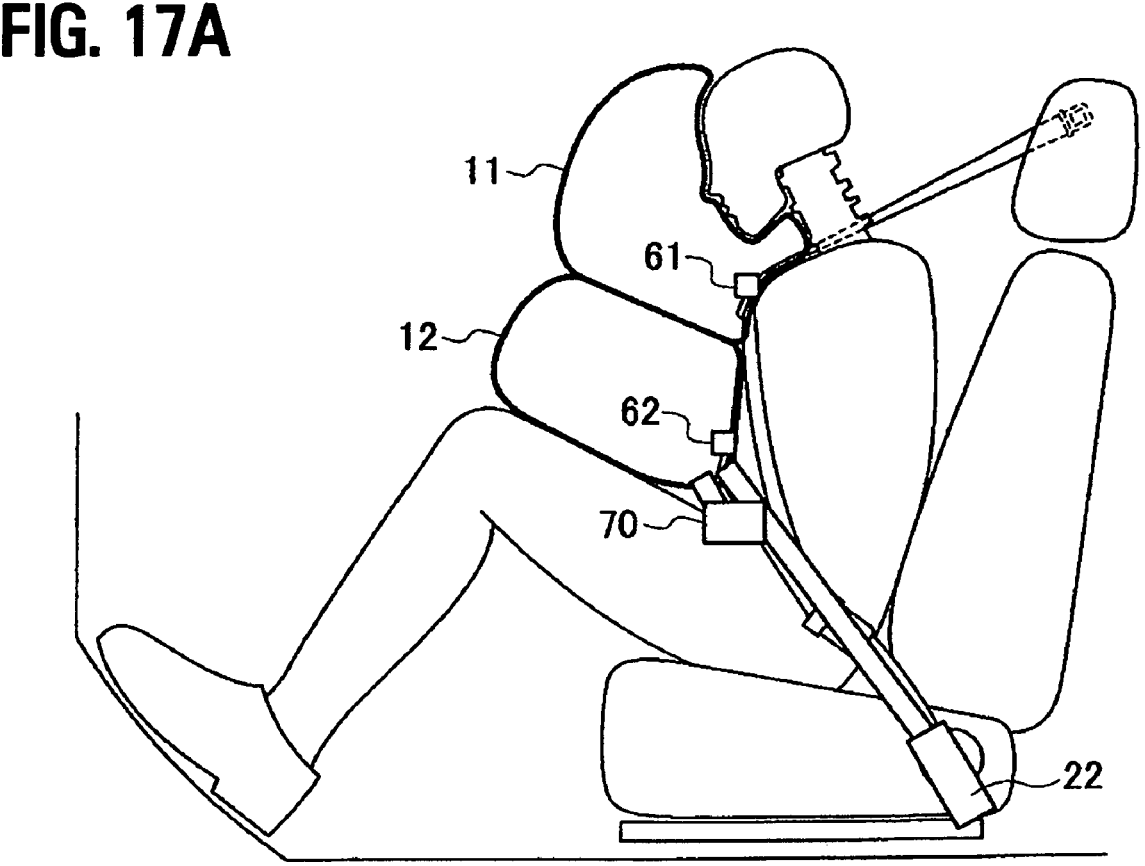
Figure 17B:
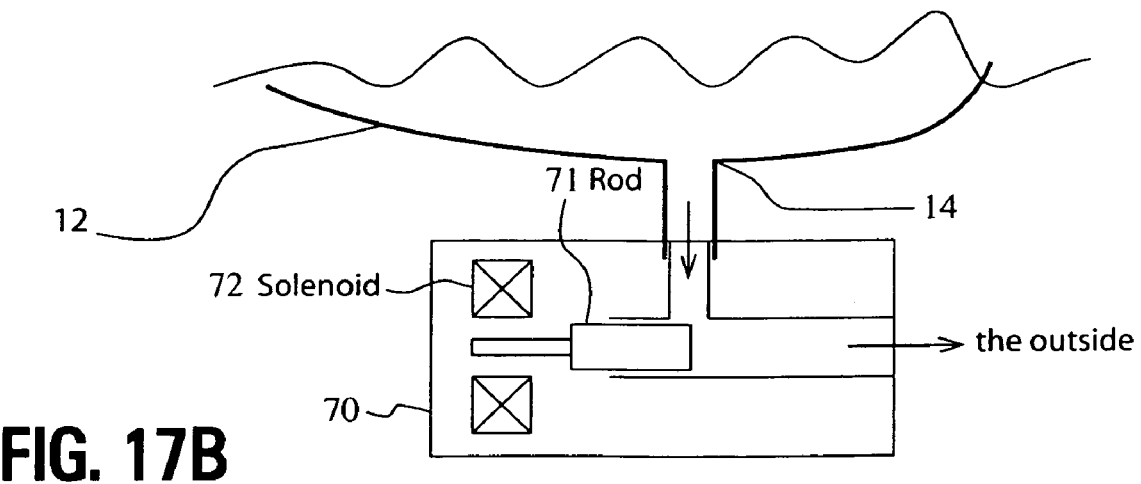

FIG. 17 shows the detailed constitution of valve 70 of the passenger protective device 7 pertaining to Embodiment 7. In the drawing, (a) shows the area around the seat and (b) shows a detailed illustration of valve 70. As shown in FIG. 17 (a), valve 70 is placed in the vicinity of thigh airbag 12 and is constituted so as to control the volume of gas that flows out of the vent hole 14 of to thigh airbag 12. Therefore, valve 70 functions as the control means for the outflowing gas. In addition, as shown in FIG. 17 (b), valve 70 has the same constitution as that shown in FIG. 15, and moves rod 71 by means of solenoid 72 to open and close the flow path.

By using this type of constitution, control unit 30 causes gas to flow into airbags 11 and 12 from inflators 21 and 22 when a collision occurs and reads the value detected from both internal pressure sensors 61 and 62. Then, control unit 30 controls the volume of outflowing gas so that the internal pressure PI of thigh airbag 12 becomes lower than the internal pressure Pu of head airbag 11.

In this manner, according to the passenger protective device 7 and the method pertaining to Embodiment 7, stable protective performance can be achieved even when the airbag is deployed from the seatbelt, as was the case in Embodiment 6, and the passenger's head can be appropriately restrained.

Furthermore, according to Embodiment 7, the volume of gas exhausted is controlled by making the internal pressure PI of thigh airbag 12 smaller than the internal pressure Pu of head airbag 11. Therefore, the internal pressure of thigh airbag 12 can easily and reliably be made smaller than the internal pressure of head airbag 11.

Next is provided an explanation of Embodiment 8 of the present invention. The passenger protective device pertaining to Embodiment 8 is the same as that pertaining to Embodiment 1, with the exception of a portion of the constitution and contents of the processing. Below is provided an explanation of the difference between Embodiment 8 and Embodiment 1.

Figure 18:
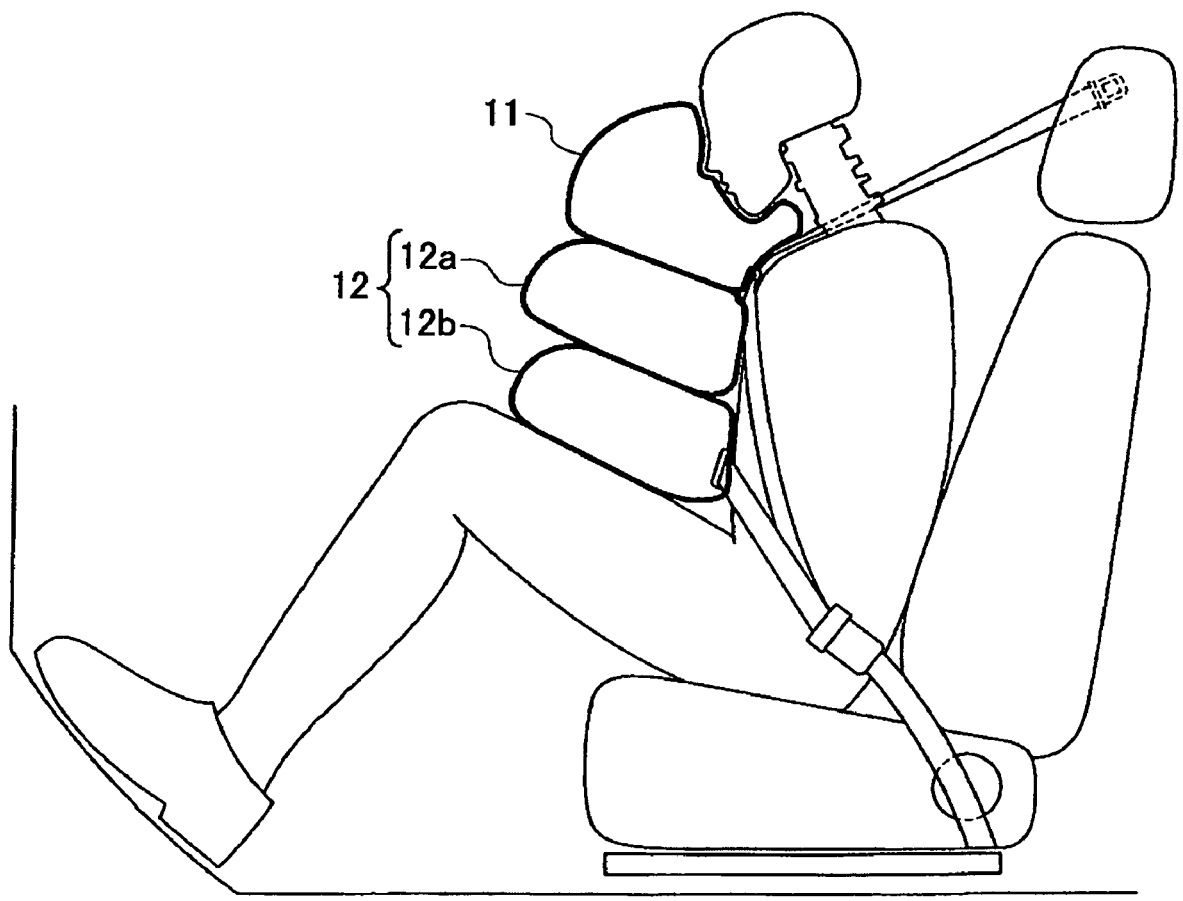
FIG. 18 is a diagram showing the constitution of the area around the seat for the passenger protective device pertaining to Embodiment 8.

The passenger protective device 8 pertaining to Embodiment 8 is equipped with at least three airbags. Below is provided an explanation of an example in which passenger protective device 8 is equipped with three airbags. FIG. 18 shows the constitution of the area around the seat of the passenger protective device pertaining to Embodiment 8. As shown in this drawing, Embodiment 8 comprises thigh airbag 12, which consists of a plurality of airbags 12*a* and 12*b*, wherein the passenger's thigh is caught by the lower airbag 12*b*, and head airbag 11 is supported by the upper airbag 12*a*.

Since thigh airbag 12 comprises a plurality of airbags, it is desirable to provide a plurality of thigh inflators 22 to coincide with the number of airbags. By providing a plurality of thigh airbags 12, the capacity of each individual airbag can be made smaller, and by providing a plurality of thigh inflators 22, the gas is caused to flow into the small airbags, and the airbags can be deployed quickly.

Figure 19A:
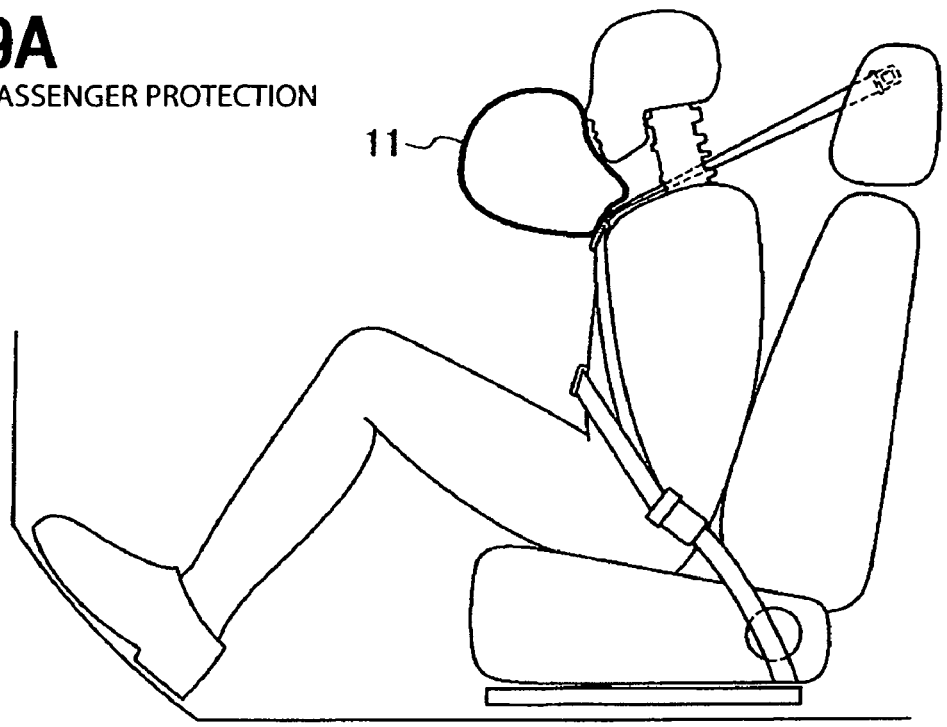
Figure 19B:
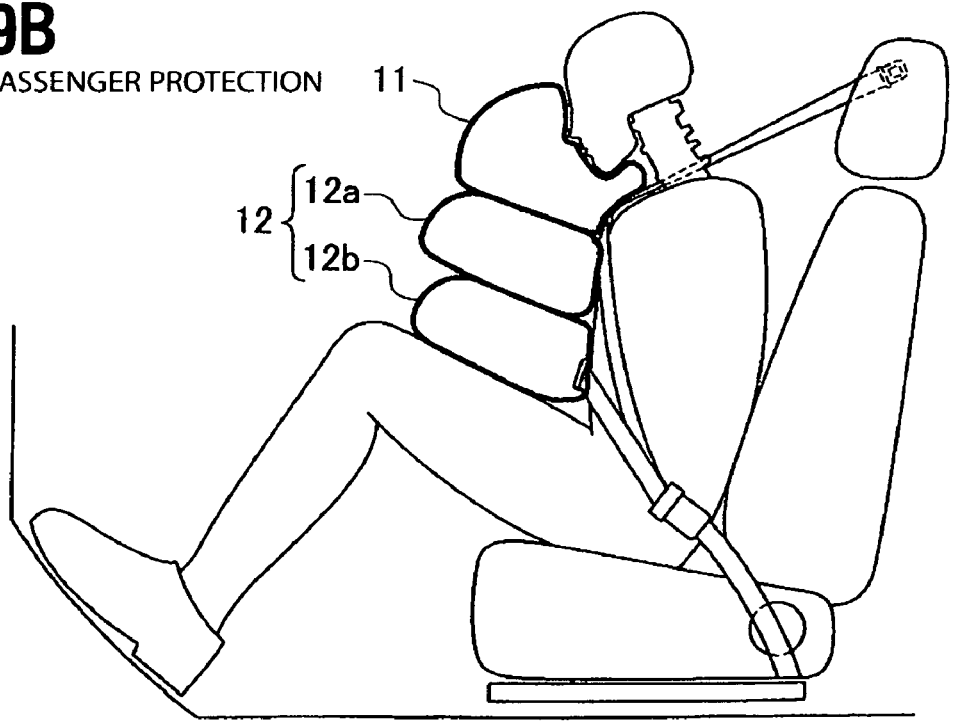

FIG. 19 is an explanatory diagram showing an overview of the passenger protective method pertaining to Embodiment 8. In this drawing, (a) is an illustration of when passenger protection starts and (b) is an illustration of when passenger protection ends. In addition, when an impact that exceeds a fixed value is detected by impact sensor 40 when a collision occurs, control unit 30 sends a gas-generating signal to head inflator 21. Due to this, as shown in FIG. 19 (*a*), head airbag 11 is deployed and catches the passenger's head as it moves due to inertial force.

Next, control unit 30 sends a gas-generating signal to thigh inflator 22. Due to this, as shown in FIG. 19 (*b*), the two airbags 12*a* and 12*b* are deployed between head airbag 11 and the passenger's thigh. Thus, head airbag 11 and the two airbags 12*a* and 12*b* completely fill in the space between the passenger's head and thigh. At this point, the two airbags 12*a* and 12*b* are soft due to the fact that the internal pressure of at least one of them is made lower than the internal pressure of head airbag 11. Therefore, head airbag 11 easily penetrates into thigh airbag 12.

In this manner, according to the passenger protective device 8 and the method pertaining to Embodiment 8, a stable protective performance can be achieved even when deploying the airbag from the seatbelt, and the passenger's head can be appropriately restrained.

Furthermore, according to Embodiment 8, thigh airbag 12 comprises a plurality of airbags 12*a* and 12*b*, and of the plurality of airbags 12*a* and 12*b*, at least one of them supports head airbag 11. Therefore, even when there are three or more airbags, a stable protective performance can be achieved and the passenger's head can be appropriately restrained.

For Embodiment 8, in order to quickly deploy the airbags, it is desirable to provide the same number of inflators to coincide with the number of airbags. Also, the number of airbags is not limited to three, and four or more airbags may be used. Furthermore, the Embodiment is not limited to providing a plurality of thigh airbags 12, and a plurality of head airbags 11 may also be provided.

Next is provided an explanation of Embodiment 9 of the present invention. The passenger protective device pertaining to Embodiment 9 is the same as that pertaining to Embodiment 8, with the exception of a portion of the contents of the processing. Below is provided an explanation of the difference between Embodiment 9 and Embodiment 8.

Figure 20A:
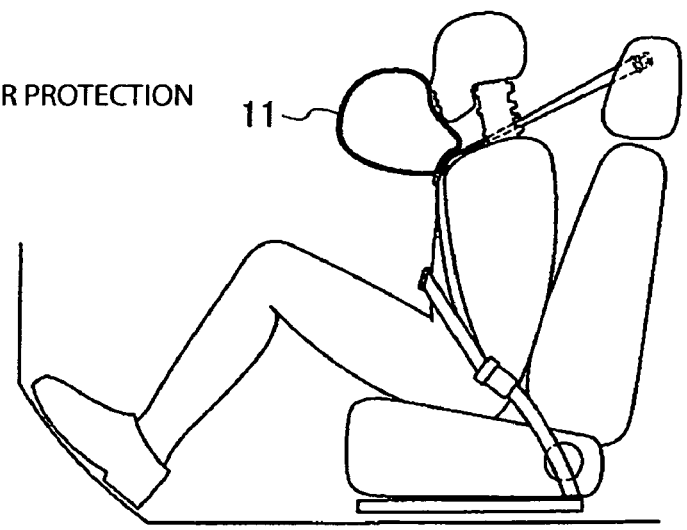
Figure 20B:
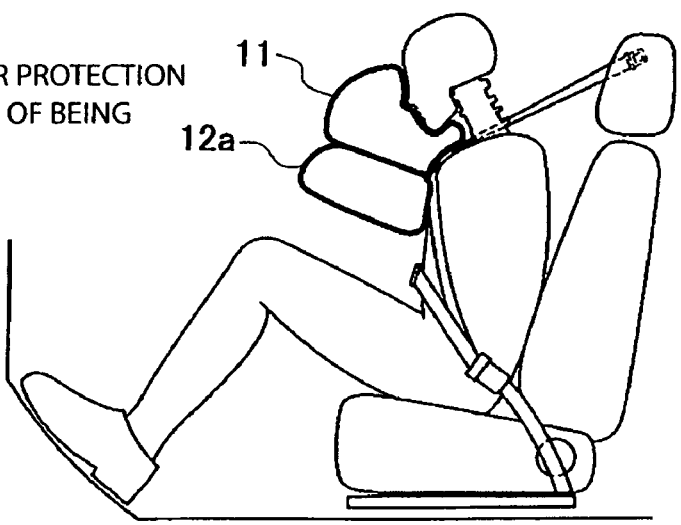
Figure 20C:
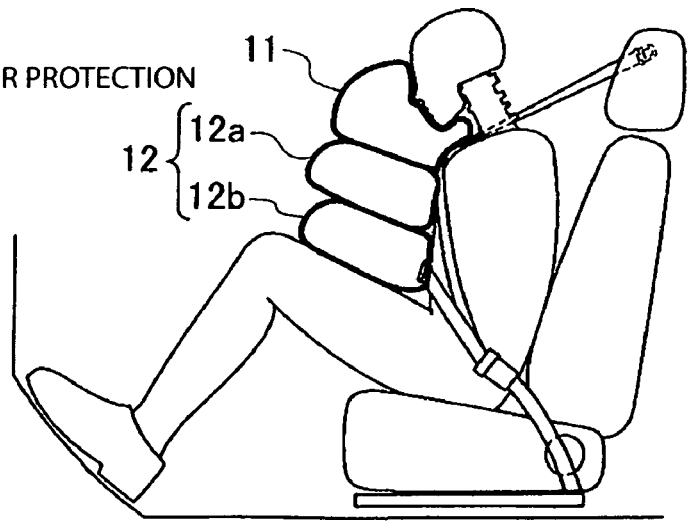

FIG. 20 is an explanatory diagram showing an overview of the passenger protective method pertaining to Embodiment 9. In this drawing, (a) is an illustration for when the passenger protection starts, (b) is an illustration for when the passenger protection is in the process of being performed and (c) is an illustration for when the passenger protection ends. First, when an impact that exceeds a fixed value is detected by impact sensor 40 when a collision occurs, as shown in FIG. 20 (*a*), control unit 30 deploys head airbag 11 and catches the passenger's head as it moves due to inertial force. Next, as shown in FIG. 20 (*b*), control unit 30 deploys upper airbag 12*a* from thigh airbag 12, and as shown in FIG. 20 (*c*), deploys the lower airbag 12*b*.

In this manner, the timing in which the internal pressure of head airbag 11, upper airbag 12*a*, and lower airbag 12*b* peaks and the timing in which their capacity reaches the maximum is made slower in this order. In other words, the timing in which the internal pressure peaks and the timing in which the capacity reaches the maximum is made to be slower in order from the airbag at the top to the airbag at the bottom.

In this manner, according to the passenger protective device 9 pertaining to Embodiment 9, a stable protective performance can be achieved even when deploying the airbags from the seatbelt, as was the case in Embodiment 8, and the passenger's head can be appropriately restrained. In addition, even when there are three or more airbags, a stable protective performance can be achieved and the passenger's head can be appropriately restrained.

Furthermore, for Embodiment 9, head airbag 11 and thigh airbag 12 comprise at least three airbags, and the timing in which the internal pressure peaks and the timing in which the capacity reaches the maximum for these three or more airbags is made the slowest in order from the top airbag to the bottom airbag. Therefore, the three or more airbags interlock to improve the effects of impact absorption and restraint of the passenger's head.

Next is provided an explanation of Embodiment 10 of the present invention. The passenger protective device pertaining to Embodiment 10 is the same as that pertaining to Embodiment 1, with the exception of a portion of the constitution. Below is provided an explanation of the difference between Embodiment 10 and Embodiment 1.

Figure 21:
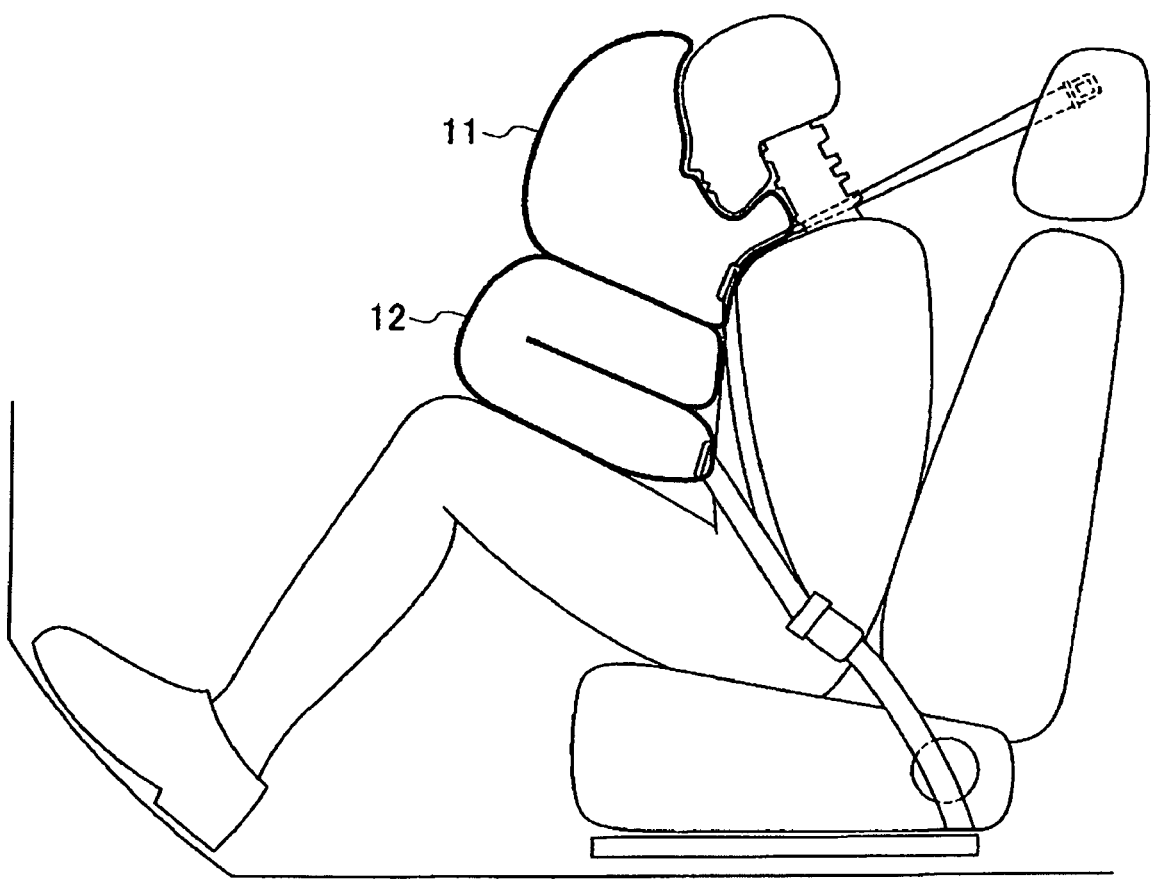
FIG. 21 is a diagram showing the constitution of the area around the seat for the passenger protective device pertaining to Embodiment 10.

FIG. 21 shows the constitution of the area around the seat of the passenger protective device pertaining to Embodiment 10. As shown in FIG. 21, for Embodiment 10, thigh airbag 12 is constituted so that it folds back midway. Due to this, the resistance for thigh airbag 12 increases when gas flows into it, causing it to deploy slower than head airbag 11. However, the constitution of thigh airbag 12 is not limited to such a constitution, and may be provided with a membrane that divides the space inside of the bag-shaped airbag provided in Embodiment 1, and a small hole can be provided in this membrane so as to make the speed at which thigh airbag 12 deploys slower than that with which head airbag 11 deploys. In this manner, the timing in which the internal pressure peaks and in which the capacity reaches the maximum for thigh airbag 12 can easily be made slower than that of head airbag 11.

In this manner, according to the passenger protective device 10 and the method pertaining to Embodiment 10, a stable protective performance can be achieved even when deploying the airbag from the seatbelt, as was the case in Embodiment 1, and the passenger's head can be appropriately restrained.

In addition, for Embodiment 10, thigh airbag 12 is constituted so that it deploys slower than head airbag 11. Therefore, even if thigh airbag 12 and head airbag 11 are both deployed at the same time, the timing in which the internal pressure peaks and in which the capacity reaches the maximum can easily be made slower for thigh airbag 12 than for the head airbag.

The present invention has thus been explained in accordance with the aforementioned embodiments, but the present invention is not limited to the aforementioned embodiments and changes may be made or the embodiments may be combined as long as they do not deviate from the gist of the present invention. For example, an explanation was provided using an example of protection for car passengers, but the present invention may be used for passenger protection pertaining to other vehicles.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A passenger protective device, comprising:
   a head airbag provided in a seatbelt and configured to deploy so as to catch a passenger's head when deployed;
   a thigh airbag provided in the seatbelt and configured to deploy so as to fill in the space from the deployed head airbag to the passenger's thigh; and
   a control unit configured to deploy the head and thigh airbags such that an internal pressure of the thigh airbag peaks later than an internal pressure of the head airbag.

2. The passenger protective device of claim 1, wherein the speed in which the thigh airbag is deployed is slower than the speed in which the head airbag is deployed.

3. The passenger protective device of claim 1, wherein the thigh airbag comprises a plurality of airbags, and the head airbag is supported by one or more of the plurality of thigh airbags.

4. The passenger protective device of claim 1, wherein the head airbag and the thigh airbag comprise at least three airbags, and the at least three airbags are provided so that the timing in which the internal pressure peaks for each airbag becomes slower in order from the airbag at nearest the head to the airbag nearest the thigh.

5. The passenger protective device of claim 1, wherein the control unit makes the internal pressure of the thigh airbag lower than the internal pressure of the head airbag when deploying the head and thigh airbags.

6. A passenger protective device, comprising:
   a head airbag provided in a seatbelt and configured to deploy so as to catch a passenger's head when deployed;
   a thigh airbag provided in the seatbelt and configured to deploy so as to fill in the space from the deployed head airbag to the passenger's thigh; and
   a control unit configured to deploy the head and thigh airbags such that a capacity of the thigh airbag reaches a maximum later than a capacity of the head airbag.

7. The passenger protective device of claim 6, wherein the speed in which the thigh airbag is deployed is slower than the speed in which the head airbag is deployed.

8. The passenger protective device of claim 6, wherein the thigh airbag comprises a plurality of airbags, and the head airbag is supported by one or more of the plurality of thigh airbags.

9. The passenger protective device of claim 6, wherein the head airbag and the thigh airbag comprise at least three airbags, and the at least three airbags are provided so that the timing in which the capacity reaches the maximum for each airbag becomes slower in order from the airbag nearest the head to the airbag nearest the thigh.

10. The passenger protective device of claim 6, wherein the control unit makes the internal pressure of the thigh airbag lower than the internal pressure of the head airbag when deploying the head and thigh airbags.

11. The passenger protective device of claim 6, and further comprising:
    an airbag inflator having an output set so that the internal pressure of each of the thigh airbags is lower than for the head airbag.

12. The passenger protective device of claim 6, wherein each of the head airbag and the thigh airbag have a vent hole, with the vent hole of the thigh airbag being larger than the vent hole of the head airbag.

13. The passenger protective device of claim 6, and further comprising:
    a head airbag internal pressure detection device arranged to detect the internal pressure of the head airbag;
    a thigh airbag internal pressure detection device arranged to detect the internal pressure of the thigh airbag; and
    an inflowing gas control device arranged to control the amount of gas that flows into at least one of the airbags when the head airbag and the thigh airbag are deployed
    wherein the control unit controls the amount of inflowing gas by the inflowing gas control device so that the internal pressure detected by the thigh airbag internal pressure detection device is smaller than the internal pressure detected by the head airbag internal pressure detection device.

14. The passenger protective device of claim 6, and further comprising:
    a head airbag internal pressure detection device arranged to detect the internal pressure of the head airbag;
    a thigh airbag internal pressure detection device arranged to detect the internal pressure of the thigh airbag; and
    an outflowing gas control device arranged to control the amount of gas that flows out from at least one of either the head airbag or the thigh airbag;
    wherein the control unit controls the amount of outflowing gas by the outflowing gas control device so that the internal pressure detected by the thigh airbag internal pressure detection device is smaller than the internal pressure detected by the head airbag internal pressure detection device.

15. The passenger protective device of claim 6, wherein the head airbag and the thigh airbag comprise at least three airbags, and the at least three airbags are provided so that the timing in which the internal pressure peaks becomes slower in order from the airbag at the top to the airbag at the bottom.

16. A passenger protective device, comprising:
    a head airbag configured to deploy so as to catch a passenger's head;
    a thigh airbag configured to deploy so as to catch the head airbag so as to fill in the space from the deployed head airbag to the passenger's thigh, the head airbag being configured to penetrate the thigh airbag after the head airbag catches the passenger's head; and
    a control unit configured to deploy the head and thigh airbags with an internal pressure of the thigh airbag being lower than an internal pressure of the head airbag when the head airbag catches the passenger's head.

17. The passenger protective device of claim 16, wherein the control unit is adapted to control timing of the head and thigh airbags so that the head airbag deploys before the thigh airbag.

18. The passenger protective device of claim 16, wherein the control unit is adapted to control internal pressure of the head and thigh airbags so that the thigh airbag internal pressure remains lower than the head airbag internal pressure.

19. The passenger protective device of claim 16, wherein the control unit is configured to control timing of the head and thigh airbags so that the head airbag deploys before the thigh airbag, and to control internal pressure of the head and thigh airbags so that the thigh airbag internal pressure remains lower than the head airbag internal pressure.

20. The passenger protective device of claim 16, wherein the thigh airbag comprises a plurality of airbags, and the head airbag is supported by one or more airbags of the plurality of airbags.

21. A passenger protective method, comprising:
deploying a head airbag when a vehicle collision is detected so as to catch a passenger's head as it moves due to inertial force;
deploying a thigh airbag so as to fill in the space from the deployed head airbag to the passenger's thigh while catching the head airbag, the head airbag penetrating the thigh airbag after the head airbag catches the passenger's head; and
controlling an internal pressure of the thigh airbag to be lower than an internal pressure of the head airbag when the head airbag catches the passenger's head.

22. The method of claim 21, wherein the head airbag is deployed before the thigh airbag.

23. The method of claim 21, wherein the head airbag is deployed to a higher internal pressure than the thigh airbag.

24. The method of claim 21, wherein the head and thigh airbags are deployed so that the head airbag deploys before the thigh airbag, and that the thigh airbag internal pressure remains lower than the head airbag internal pressure.

25. The method of claim 21, wherein the deploying of the thigh airbag comprises deploying a plurality of thigh airbags, and the head airbag is supported by one or more of the plurality of thigh airbags.

26. The method of claim 21, wherein the deploying of the thigh airbag comprises deploying two thigh airbags.

27. The method of claim 25, wherein the deploying of the head and thigh airbags comprises deploying the head and thigh airbags in order from the head airbag to the thigh airbag closest to a thigh of a passenger.

28. A passenger protective device, comprising:
means for catching a passenger's head as it moves due to inertial force when a vehicle collision is detected;
means for supporting the means for catching by filling in a space from the means for catching to a passenger's thigh and for supporting the means for catching such that the means for catching penetrates the means for supporting after the means for catching catches the passenger's head; and
a control unit arranged to control the means for catching and the means for supporting to produce an internal pressure of the means for supporting that is lower than an internal pressure of the means for catching when the means for catching catches the passenger's head.

* * * * *